(12) United States Patent
Yoshida

(10) Patent No.: US 11,408,740 B2
(45) Date of Patent: Aug. 9, 2022

(54) MAP DATA UPDATE APPARATUS, MAP DATA UPDATE METHOD, AND COMPUTER READABLE MEDIUM

(71) Applicant: Mitsubishi Electric Corporation, Chiyoda-ku (JP)

(72) Inventor: Mitsunobu Yoshida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 342 days.

(21) Appl. No.: 16/303,934

(22) PCT Filed: Feb. 10, 2017

(86) PCT No.: PCT/JP2017/004920
§ 371 (c)(1),
(2) Date: Nov. 21, 2018

(87) PCT Pub. No.: WO2017/208503
PCT Pub. Date: Dec. 7, 2017

(65) Prior Publication Data
US 2020/0318975 A1    Oct. 8, 2020

(30) Foreign Application Priority Data

May 30, 2016 (JP) .............................. JP2016-107208

(51) Int. Cl.
*G01C 21/32* (2006.01)
(52) U.S. Cl.
CPC .................................. *G01C 21/32* (2013.01)

(58) Field of Classification Search
CPC .......... G01C 21/32; G01C 21/28; G06T 11/60; G09B 29/00; G09B 29/003
See application file for complete search history.

(56) References Cited

U.S. PATENT DOCUMENTS

| 2006/0233424 | A1 | 10/2006 | Miyajima et al. |
| 2011/0118967 | A1 | 5/2011 | Tsuda |
| 2011/0282578 | A1 | 11/2011 | Miksa et al. |
| 2016/0065944 | A1* | 3/2016 | Fujii .................... H04N 13/296 348/47 |

(Continued)

FOREIGN PATENT DOCUMENTS

| CN | 102246159 A | 11/2011 |
| EP | 1 901 260 A1 | 3/2008 |
| JP | 2-47775 A | 2/1990 |

(Continued)

OTHER PUBLICATIONS

Korean office Action dated Jan. 29, 2020 in Korean Patent Application No. 10-2018-7033526 (with Engiish translation), 10 pages (Continued)

*Primary Examiner* — James J Lee
*Assistant Examiner* — Shon G Foley
(74) *Attorney, Agent, or Firm* — Oblon, McClelland, Maier & Neustadt, L.L.P.

(57) ABSTRACT

A part of measurement data (182) is compared with a part of map data (181) based on a feature. The part of the map data is updated based on a comparison result. The map data is updated by reflecting the updated part of the map data in the map data.

14 Claims, 22 Drawing Sheets

(56) References Cited

U.S. PATENT DOCUMENTS

| | | | |
|---|---|---|---|
| 2017/0242441 A1 | 8/2017 | Nakaya et al. | |
| 2018/0202814 A1* | 7/2018 | Kudrynski | G01S 13/867 |

FOREIGN PATENT DOCUMENTS

| | | | |
|---|---|---|---|
| JP | 5-61407 A | 3/1993 | |
| JP | 5-181411 A | 7/1993 | |
| JP | 9-179967 A | 7/1997 | |
| JP | 9-319855 A | 12/1997 | |
| JP | 2000-310940 A | 11/2000 | |
| JP | 2001-126066 A | 5/2001 | |
| JP | 2004-101780 A | 4/2004 | |
| JP | 2005-234603 A | 9/2005 | |
| JP | 2005-265494 A | 9/2005 | |
| JP | 2005-345527 A | 12/2005 | |
| JP | 2006-208223 A | 8/2006 | |
| JP | 2009-69900 A | 4/2009 | |
| JP | 2009-76096 A | 4/2009 | |
| JP | 2009-129084 A | 6/2009 | |
| JP | 2010-176645 A | 8/2010 | |
| JP | 2010-185879 A | 8/2010 | |
| JP | 2013-232241 A | 11/2013 | |
| JP | 2014-178285 A | 9/2014 | |
| JP | 2016-45609 A | 4/2016 | |
| WO | WO 2007/007376 A1 | 1/2007 | |
| WO | WO 2016/027394 A1 | 2/2016 | |

OTHER PUBLICATIONS

Korean Office Action dated Aug. 26, 2020 in Patent Application No. 10-2018-7033526 (with English translation), 7 pages.
Extended European Search Report dated May 6, 2019 in Patent Application No. 17806065.3.
Japanese Office Action dated Sep. 24, 2019 in Japanese Patent Application No. 2018-520351 (with unedited computer generated English translation), 5 pages.
Japanese Office Action dated Feb. 26, 2019 in the corresponding Japanese Patent Application No. 2018-520351 (with English Translation).
Japanese Office Action dated Mar. 17, 2020, in Patent Application No. 2019-229856, 8 pages (with unedited computer generated English translation).
Japanese Reconsideration Report by Examiner before Appeal dated Mar. 5, 2020 in Japanese Patent Appiication No. 2018-520351 (with Engiish translation), 9 pages.
Korean office Action dated Jan. 29, 2020 in Korean Patent Application No. 10-2018-7033526 (with English translation), 10 pages.
International Search Report dated Apr. 11, 2017 in PCT/JP2017/004920 filed Feb. 10, 2017.
Taiwanese Office Action dated Nov. 1, 2017 in Taiwan Patent Application No. 106105855, (with English translation).
Taiwanese Office Action dated Feb. 26, 2018 in Taiwan Patent Application No. 106105855, (with English translation).

* cited by examiner

MAP DATA UPDATE APPARATUS, MAP DATA UPDATE METHOD, AND COMPUTER READABLE MEDIUM

TECHNICAL FIELD

The present invention relates to a technique for updating map data.

BACKGROUND ART

When map data representing a detailed road map is generated using a mobile mapping system (MMS), since data measured by a measurement vehicle of the MMS includes measurement errors, the measurement data is modified using data that is actually measured by a survey technique, and then map data is generated.

When repainting of a white line, a road repair work, or the like, occurs, since changes occur in the road map, the map data needs to be updated.

However, performing actual measurement on a location where the change has occurred, using a survey technique takes time and trouble.

In addition, even if the location where the change has occurred is measured using the MMS, measurement data obtained by the MMS cannot be reflected in the map data as it is, and data that is actually measured by a survey technique needs to be obtained to modify the measured data.

Patent Literature 1 discloses a technique for generating map data using the MMS.

CITATION LIST

Patent Literature

Patent Literature 1: JP 2009-076096 A

SUMMARY OF INVENTION

Technical Problem

An object of the present invention is to allow to update map data using measurement data.

Solution to Problem

A map data update apparatus according to the present invention includes:

an amount-of-shift calculating unit to calculate an amount of shift in a location of a common ground object between map data and measurement data, using the map data and the measurement data, the map data including pieces of location information of ground objects present at a reference time, and the measurement data being data obtained by measurement performed at a measurement time occurring after the reference time, and including pieces of location information of ground objects present at the measurement time;

a shift correcting unit to correct the pieces of location information included in the measurement data, based on the calculated amount of shift;

a difference extracting unit to extract a difference between a set of the ground objects present at the reference time and a set of the ground objects present at the measurement time, using the map data and the corrected measurement data; and a map data updating unit to update the map data based on the extracted difference.

Advantageous Effects of Invention

According to the present invention, it becomes possible to update map data using measurement data.

DESCRIPTION OF EMBODIMENTS

Figure 1:
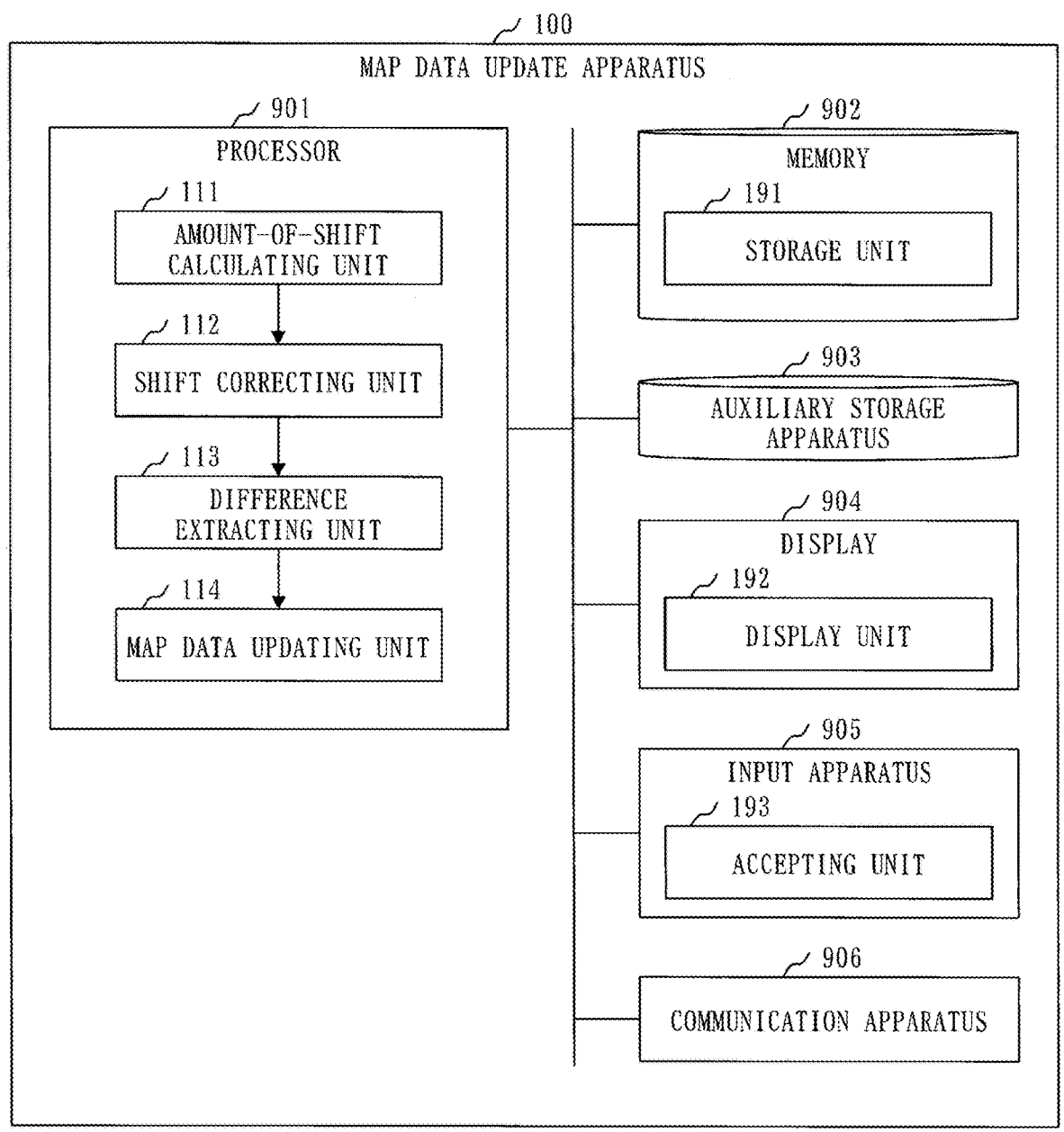
FIG. 1 is a configuration diagram of a map data update apparatus 100 of a first embodiment.

In embodiments and the drawings, the same or corresponding elements are provided with the same reference signs. Description of the elements provided with the same reference signs is omitted or simplified as appropriate.

First Embodiment

A mode in which map data is updated will be described based on FIGS. 1 to 15.

*Description of a Configuration*

A configuration of a map data update apparatus 100 will be described based on FIG. 1.

The map data update apparatus 100 is a computer including hardware such as a processor 901, a memory 902, an auxiliary storage apparatus 903, a display 904, an input apparatus 905, and a communication apparatus 906. These pieces of hardware are connected to each other through signal lines.

The processor 901 is an integrated circuit (IC) that performs processing, and controls other hardware. Specifically, the processor 901 is a CPU, a DSP, or a GPU. The CPU is the abbreviation for central processing unit, the DSP is the abbreviation for digital signal processor, and the GPU is the abbreviation for graphics processing unit.

The memory 902 is a volatile storage apparatus. The memory 902 is also called a main storage device or a main memory. Specifically, the memory 902 is a random access memory (RAM).

The auxiliary storage apparatus 903 is a nonvolatile storage apparatus. Specifically, the auxiliary storage apparatus 903 is a ROM, an HDD, or a flash memory. The ROM is the abbreviation for read only memory, and the HDD is the abbreviation for hard disk drive.

Hardware in which the processor 901, the memory 902, and the auxiliary storage apparatus 903 are put together is referred to as "processing circuitry".

The display 904 is a display apparatus that displays images, etc. Specifically, the display 904 is a liquid crystal display. The display 904 is also referred to as monitor.

The input apparatus 905 is an apparatus that accepts input. Specifically, the input apparatus 905 is a keyboard, a mouse, a numeric keypad, or a touch panel.

The communication apparatus 906 is an apparatus that performs communication, and includes a receiver and a transmitter. Specifically, the communication apparatus 906 is a communication chip or a network interface card (NIC).

The map data update apparatus 100 includes "units" such as an amount-of-shift calculating unit 111, a shift correcting unit 112, a difference extracting unit 113, and a map data updating unit 114, as functional configuration elements. The functions of the "units" are implemented by software. The functions of the "units" will be described later.

In the auxiliary storage apparatus 903 there is stored a program that implements the functions of the "units". The program that implements the functions of the "units" is loaded into the memory 902 and executed by the processor 901.

Furthermore, in the auxiliary storage apparatus 903 there is stored an operating system (OS). At least a part of the OS is loaded into the memory 902 and executed by the processor 901.

That is, the processor 901 executes the program that implements the functions of the "units" while executing the OS.

Data obtained by executing the program that implements the functions of the "units" is stored in a storage apparatus such as the memory 902, the auxiliary storage apparatus 903, a register in the processor 901, or a cache memory in the processor 901.

The memory 902 functions as a storage unit 191 that stores data to be used, generated, inputted, outputted, transmitted, or received by the map data update apparatus 100. Note, however, that other storage apparatuses may function as the storage unit 191.

The display 904 functions as a display unit 192 that displays images, etc.

The input apparatus 905 functions as an accepting unit 193 that accepts input.

The communication apparatus 906 functions as a communicating unit that communicates data. In the communication apparatus 906, the receiver functions as a receiving unit that receives data, and the transmitter functions as a transmitting unit that transmits data.

The map data update apparatus 100 may include a plurality of processors which are a substitution of the processor 901. The plurality of processors share the execution of the program that implements the functions of the "units".

The program that implements the functions of the "units" can be stored in a nonvolatile storage medium such as a magnetic disk, an optical disc, or a flash memory in a computer-readable manner. The nonvolatile storage medium is a non-transitory tangible medium.

The "units" may be read as "processes" or "steps". The functions of the "units" may be implemented by firmware.

Data to be stored in the storage unit 191 will be described based on FIG. 2.

In the storage unit 191 are stored map data 181, measurement data 182, and the like.

The map data 181 is map data including pieces of location information of ground objects present at a reference time.

Specifically, the map data 181 is fundamental geospatial data used in an automated driving assistance system. The automated driving assistance system is a system for implementing vehicle's automated driving. In addition, location information included in the map data 181 is three-dimensional coordinate values representing a point where a ground object is located.

The measurement data 182 is data that is obtained by measurement performed at a measurement time occurring after the reference time and that includes pieces of location information of ground objects present at the measurement time.

Specifically, the measurement data 182 is measurement data obtained by three-dimensional measurement using a mobile mapping system (MMS).

The MMS is a system for obtaining measurement data for a measurement area serving as a three-dimensional measurement target, by a measurement vehicle traveling the measurement area.

Figure 3:
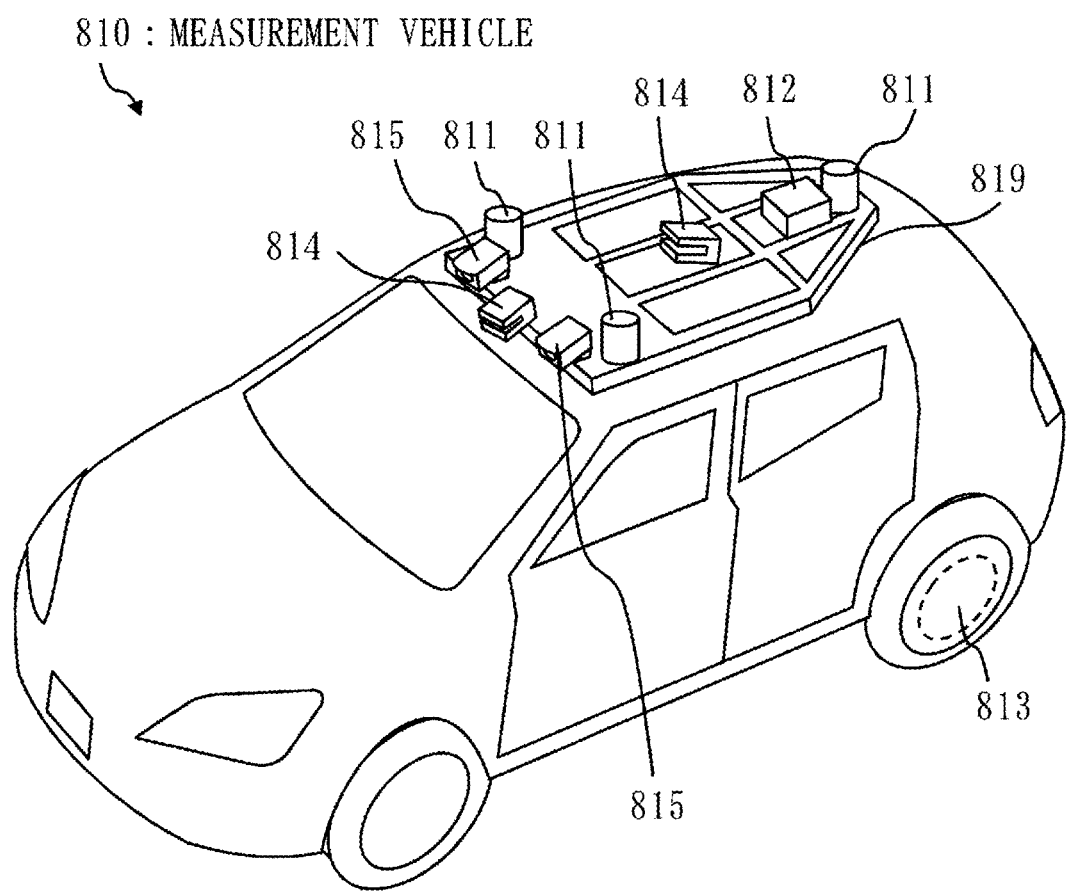
FIG. 3 is a configuration diagram of a measurement vehicle 810 of the first embodiment.

A measurement vehicle 810 will be described based on FIG. 3.

The measurement vehicle 810 is a vehicle having measuring devices mounted thereon. Specific measuring devices are GPS receivers 811, an IMU 812, an odometer 813, laser scanners 814, and cameras 815. The GPS is the abbreviation for global positioning system, and the IMU is the abbreviation for inertial measurement unit.

Vehicle location data is obtained using measurement data obtained by each of the GPS receivers 811, the IMU 812, and the odometer 813. The vehicle location data is data including, for each time, three-dimensional coordinate values representing a point where the measurement vehicle 810 is located.

Laser point cloud data and three-dimensional point cloud data are obtained by the laser scanners 814.

The laser point cloud data is data including, for each measurement point, a distance from a laser scanner 814 to the measurement point and an orientation from the laser scanner 814 to the measurement point. The measurement point is a point where laser light is irradiated and reflected.

The three-dimensional point cloud data is data that is generated using the vehicle location data and the laser point cloud data and that includes, for each measurement point, three-dimensional coordinate values representing the measurement point. Three-dimensional coordinate values of a measurement point are calculated using the three-dimensional coordinate values of the measurement vehicle 810 obtained at a time at which laser light is irradiated, a distance from a laser scanner 814 to the measurement point, and an orientation from the laser scanner 814 to the measurement point.

Photographed image data is obtained by the cameras 815. The photographed image data is data including a photographed image for each time. The photographed image is an image in which an area around the measurement vehicle 810 is captured.

The vehicle location data, the laser point cloud data, the three-dimensional point cloud data, and the photographed image data are measurement data obtained by three-dimensional measurement using the MMS.

The measurement data 182 of the first embodiment is three-dimensional point cloud data. Location information included in the measurement data 182 is three-dimensional coordinate values representing a measurement point.

*Description of Operation*

The operation of the map data update apparatus 100 corresponds to a map data update method. In addition, a procedure of the map data update method corresponds to a procedure of a map data update program.

The map data update method will be described based on FIG. 4.

Step S100 is an amount-of-shift calculation process.

At step S100, the amount-of-shift calculating unit 111 calculates the amount of shift between the map data 181 and the measurement data 182, using the map data 181 and the measurement data 182.

The amount of shift between the map data 181 and the measurement data 182 is the amount of shift in the location of a common ground object between the map data 181 and the measurement data 182. The amount of shift is represented by a vector.

An overview of the amount-of-shift calculation process (S100) will be described based on FIGS. 5 to 8.

Figure 5:
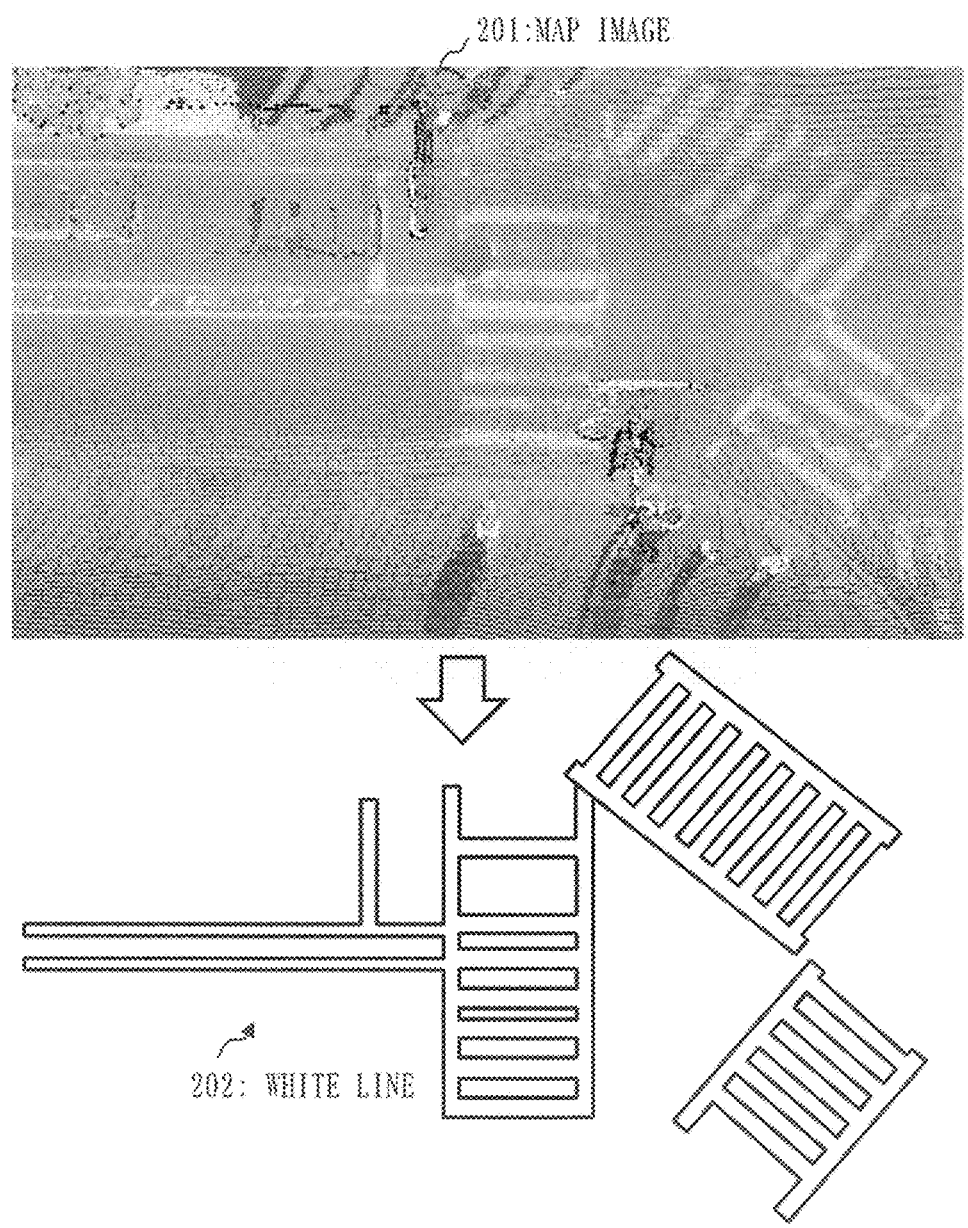
FIG. 5 is a diagram illustrating a map image 201 and a white line 202 of the first embodiment.

In FIG. 5, a map image 201 is an image based on the map data 181. The map image 201 shows ground objects present at a reference time. A white line 202 is a ground object present at the reference time.

Figure 6:
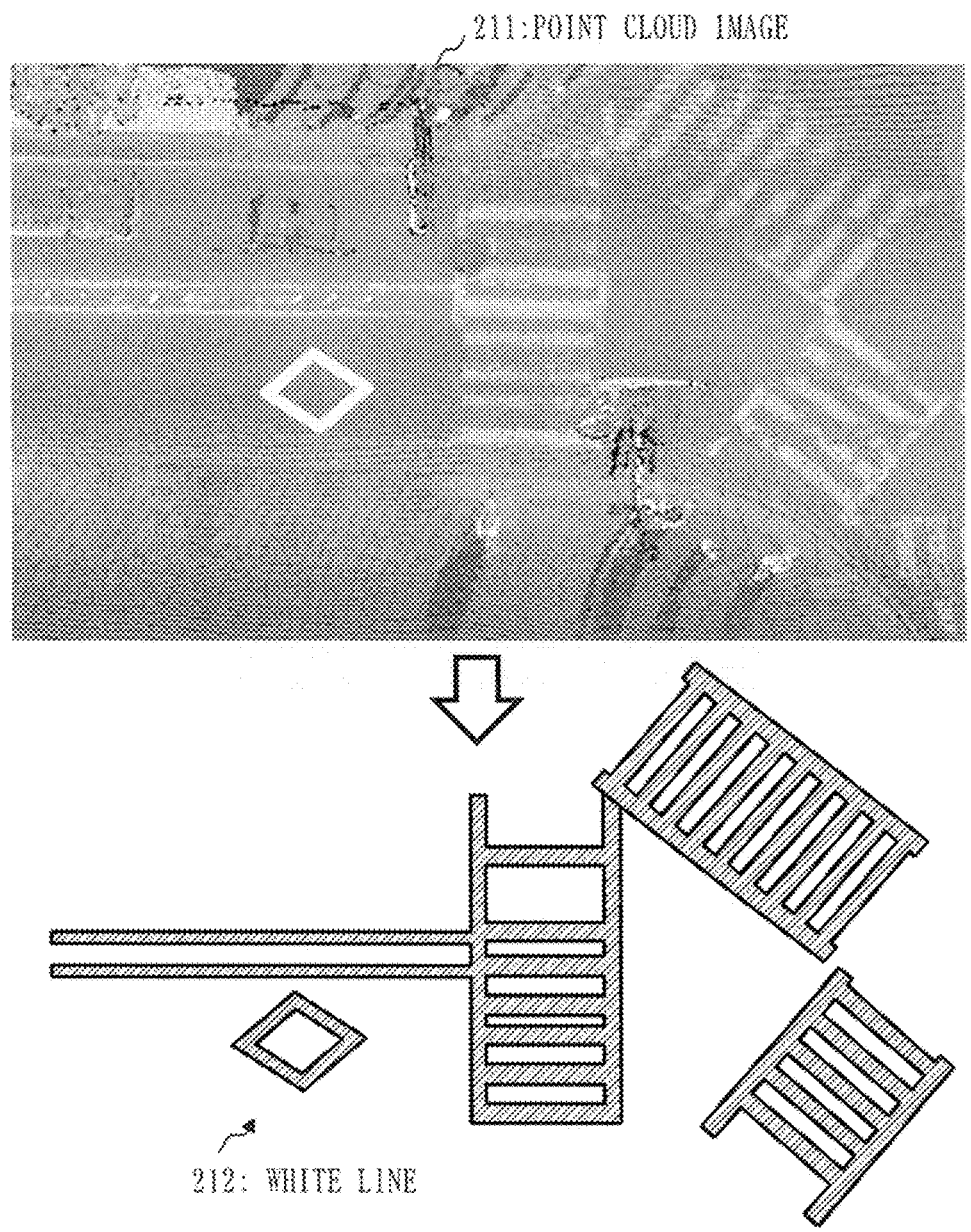
FIG. 6 is a diagram illustrating a point cloud image 211 and a white line 212 of the first embodiment.

In FIG. 6, a point cloud image 211 is an image based on three-dimensional point cloud data which is the measurement data 182. The point cloud image 211 shows ground objects present at a measurement time. A white line 212 is a ground object present at the measurement time.

Figure 7:
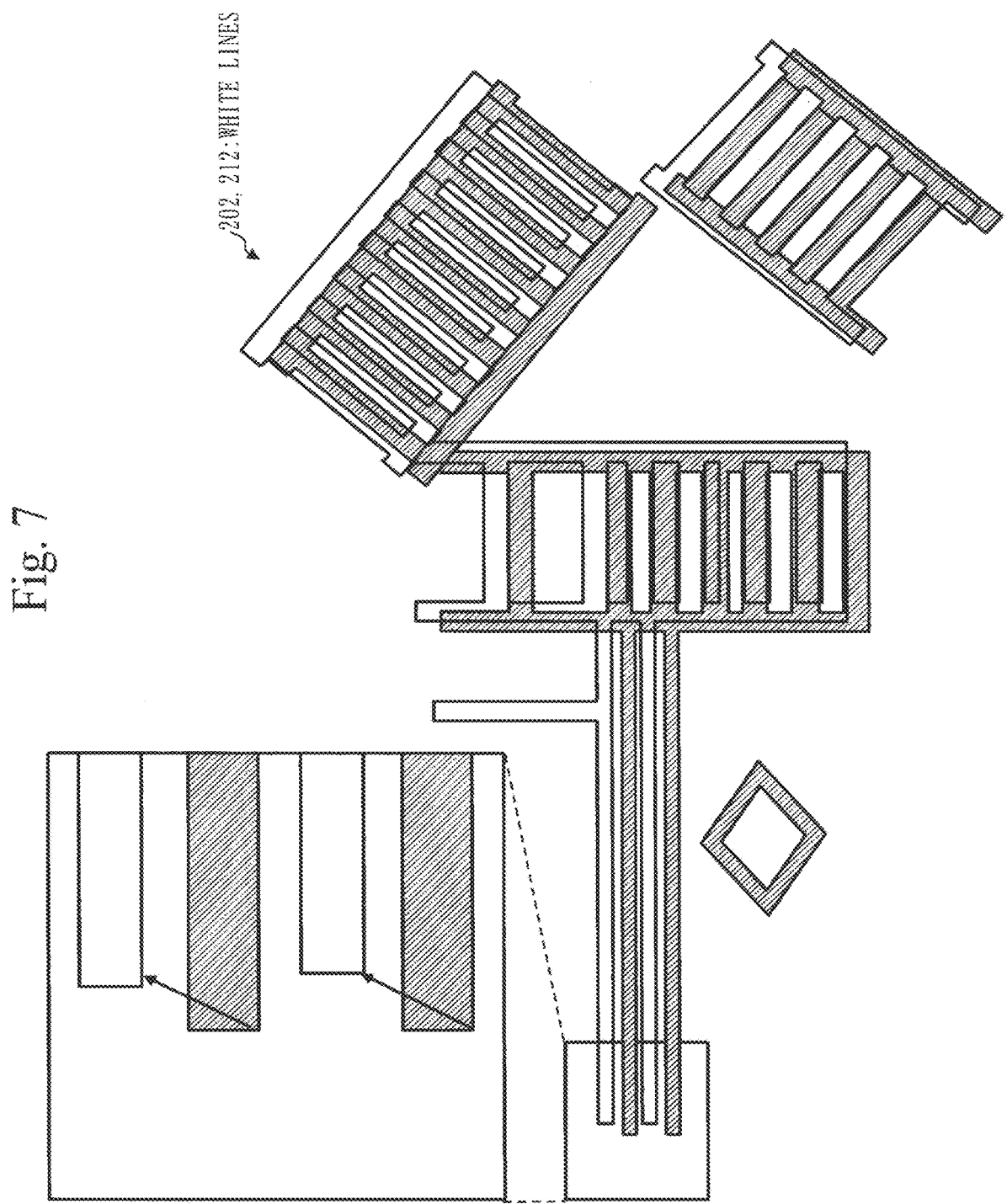
FIG. 7 is a diagram in which the white lines (202 and 212) are overlaid on top of each other in the first embodiment.

Location information included in the measurement data 182 has measurement errors. Hence, when the white line 212 of the point cloud image 211 is overlaid on the white line 202 of the map image 201, based on pieces of location information included in the measurement data 182, as illustrated in FIG. 7, a shift occurs between the white line 202 of the map image 201 and the white line 212 of the point cloud image 211. The shift occurs in a parallel direction.

The amount-of-shift calculating unit 111 calculates the amount of shift between the white line 202 of the map image 201 and the white line 212 of the point cloud image 211, as the amount of shift between the map data 181 and the measurement data 182.

Figure 8:
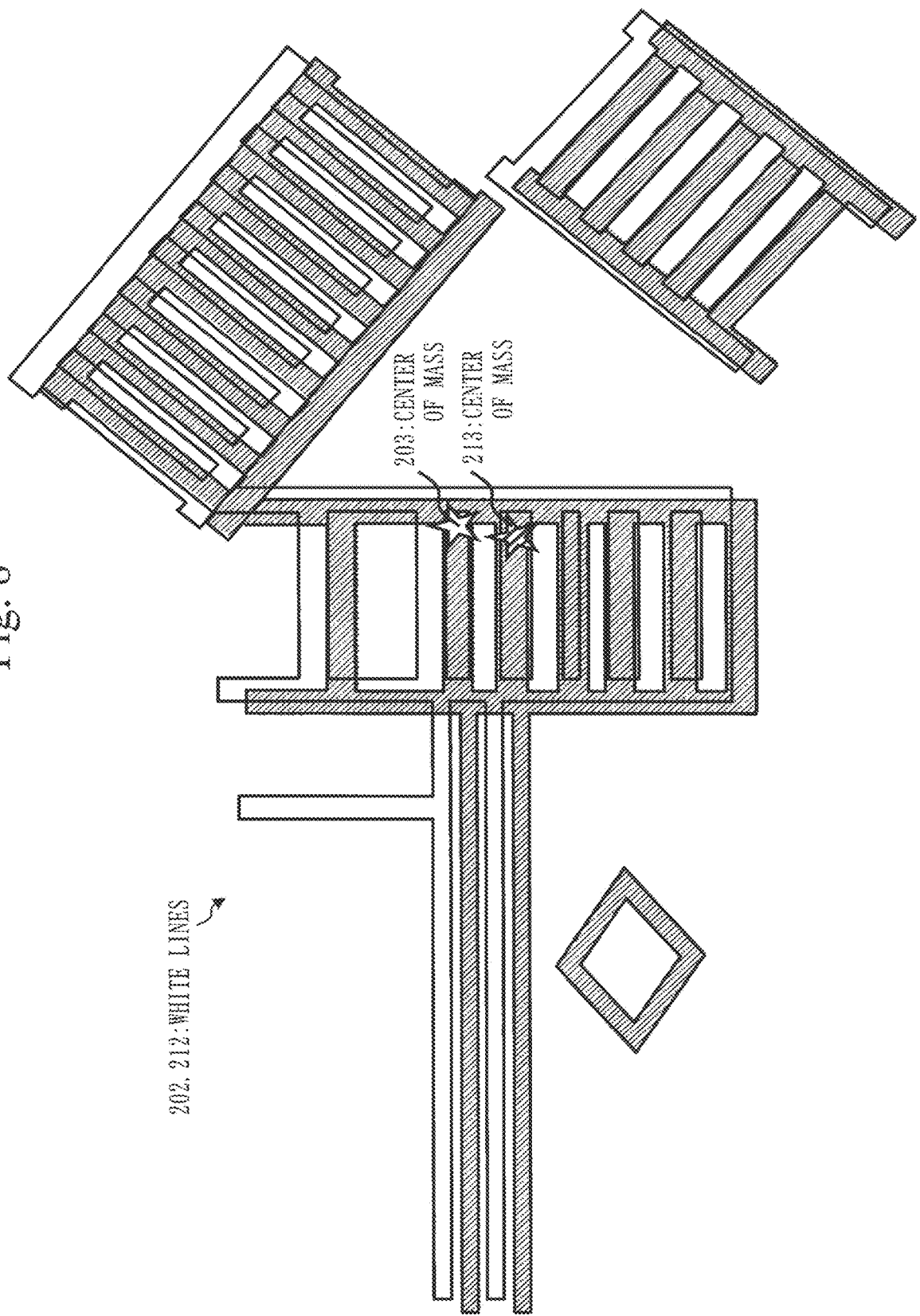
FIG. 8 is a diagram illustrating the centers of mass (203 and 213) of the white lines of the first embodiment.

In FIG. 8, a center of mass 203 is the center of mass of the white line 202 of the map image 201, and a center of mass 213 is the center of mass of the white line 212 of the point cloud image 211. Specifically, the amount-of-shift calculating unit 111 calculates the amount of shift between the centers of mass (203 and 213), as the amount of shift between the map data 181 and the measurement data 182.

A procedure of the amount-of-shift calculation process (S100) will be described based on FIG. 9.

At step S111, the amount-of-shift calculating unit 111 detects a feature which is a common ground object between the map data 181 and the measurement data 182.

A specific feature is any of a white line, a sign, and a traffic light. The feature of the first embodiment is a white line.

The amount-of-shift calculating unit 111 detects a feature from the map data 181 as follows.

The map data 181 includes ground object information for each ground object. The ground object information includes a type, an identifier, and location information. The location information included in the ground object information includes, for each corner of the ground object, three-dimensional coordinate values representing the location of the corner.

First, the amount-of-shift calculating unit 111 extracts ground object information whose type is a white line from the map data 181.

Subsequently, the amount-of-shift calculating unit 111 extracts three-dimensional coordinate values for each corner of the white line from the extracted ground object information.

Then, the amount-of-shift calculating unit 111 calculates a range of the white line using the extracted three-dimensional coordinate values.

The amount-of-shift calculating unit 111 detects a feature from the measurement data 182 as follows.

The measurement data 182 includes measurement point information for each measurement point. The measurement point information includes color information and location information. The location information included in the measurement point information is the three-dimensional coordinate values of the measurement point.

Figure 10:
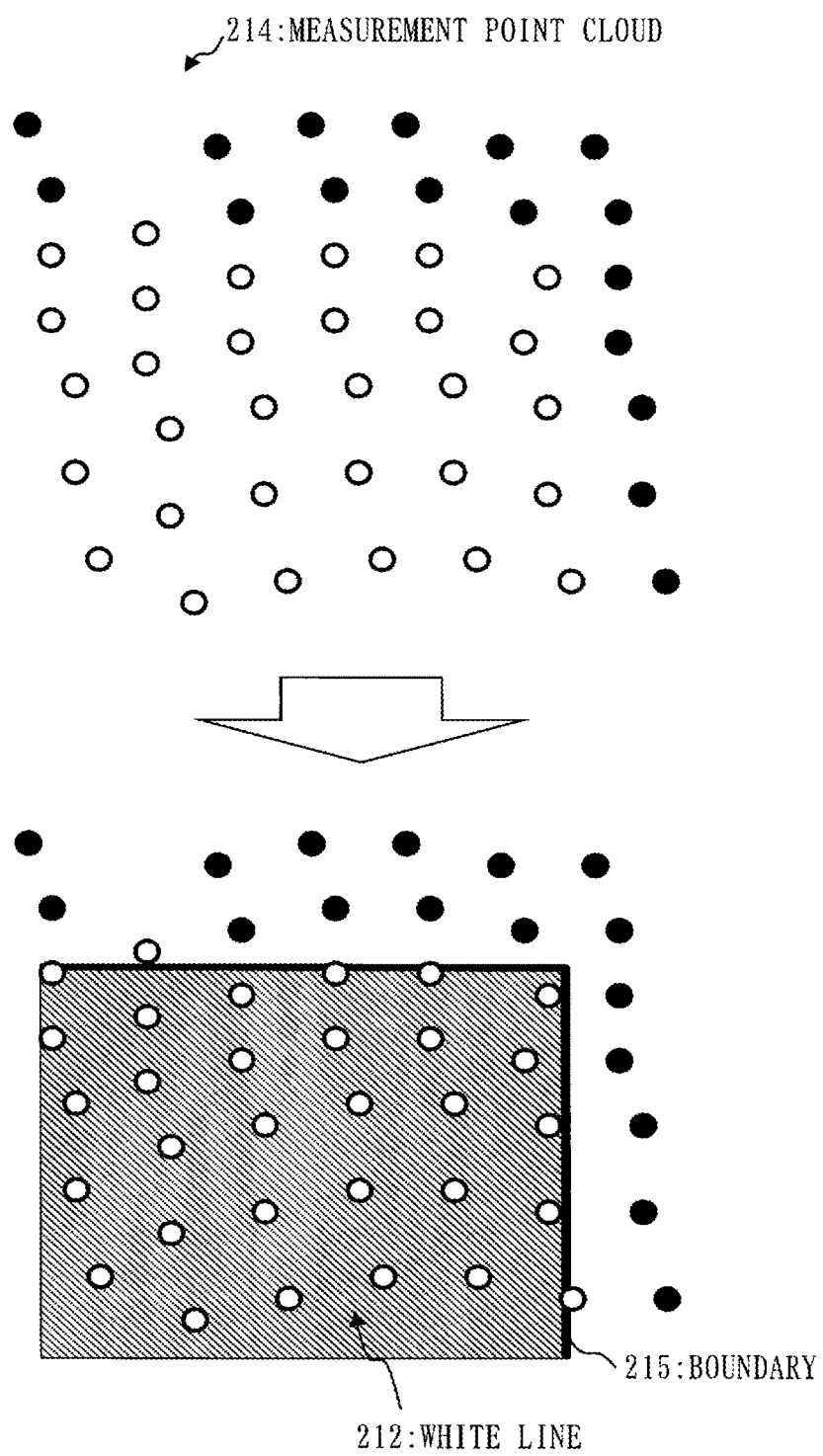
FIG. 10 is a diagram illustrating a measurement point cloud 214 and a boundary 215 of the first embodiment.

In FIG. 10, a measurement point cloud 214 is a set of measurement points corresponding to pieces of measurement point information included in the measurement data 182. A black dot is a measurement point corresponding to measurement point information that includes color information indicating a color other than white. A white dot is a measurement point corresponding to measurement point information that includes color information indicating white.

First, the amount-of-shift calculating unit 111 extracts pieces of measurement point information that include color information indicating white from the measurement data 182.

Subsequently, the amount-of-shift calculating unit 111 extracts three-dimensional coordinate values from each of the extracted pieces of measurement point information.

Subsequently, the amount-of-shift calculating unit 111 calculates a boundary 215 of the white line 212, using the extracted three-dimensional coordinate values.

Then, the amount-of-shift calculating unit 111 calculates a range of the white line 212.

Referring back to FIG. 9, description continues from step S112.

At step S112, the amount-of-shift calculating unit 111 calculates the location of the feature in the map data 181. Specifically, the location of the feature is the location of the center of mass of the feature.

The amount-of-shift calculating unit 111 calculates the location of the feature in the map data 181 as follows.

The amount-of-shift calculating unit 111 calculates three-dimensional coordinate values representing the location of the center of mass of the white line, based on the range of the white line calculated using the map data 181 at step S111. The three-dimensional coordinate values to be calculated are the location of the feature in the map data 181.

At step S113, the amount-of-shift calculating unit 111 calculates the location of the feature in the measurement data 182. Specifically, the location of the feature is the location of the center of mass of the feature.

The amount-of-shift calculating unit 111 calculates the location of the feature in the measurement data 182 as follows.

The amount-of-shift calculating unit 111 calculates three-dimensional coordinate values representing the location of the center of mass of the white line, based on the range of the white line calculated using the measurement data 182 at step S111. The three-dimensional coordinate values to be calculated are the location of the feature in the measurement data 182.

At step S114, the amount-of-shift calculating unit 111 calculates a difference between the location of the feature in the map data 181 and the location of the feature in the measurement data 182. The difference to be calculated is the amount of shift between the map data 181 and the measurement data 182.

Specifically, the amount-of-shift calculating unit 111 calculates a difference between the three-dimensional coordinate values calculated at step S112 and the three-dimensional coordinate values calculated at step S113.

Referring back to FIG. 4, description continues from step S200.

Step S200 is a shift correction process.

At step S200, the shift correcting unit 112 corrects pieces of location information included in the measurement data 182, based on the amount of shift calculated at step S100.

Specifically, the shift correcting unit 112 subtracts, for each location information included in the measurement data 182, the amount of shift from three-dimensional coordinate values which are the location information, and thereby calculates corrected three-dimensional coordinate values, and updates the three-dimensional coordinate values which are the location information to the corrected three-dimensional coordinate values.

Step S300 is a difference extraction process.

At step S300, the difference extracting unit 113 extracts differences between a set of the ground objects present at the reference time and a set of the ground objects measured at the measurement time, using the map data 181 and the corrected measurement data 182.

Specifically, the difference extracting unit 113 extracts a new ground object and a disappeared ground object, as differences.

The new ground object is a ground object that is not present at the reference time, but is measured at the measurement time. The difference extracting unit 113 extracts, from the corrected measurement data 182, location information that does not match any location information included in the map data 181, as location information of a new ground object.

The disappeared ground object is a ground object that is present at the reference time, but is not measured at the measurement time. The difference extracting unit 113 extracts, from the map data 181, location information that does not match any location information included in the corrected measurement data 182, as location information of a disappeared ground object.

An overview of the difference extraction process (S300) will be described based on FIG. 11.

Figure 11:
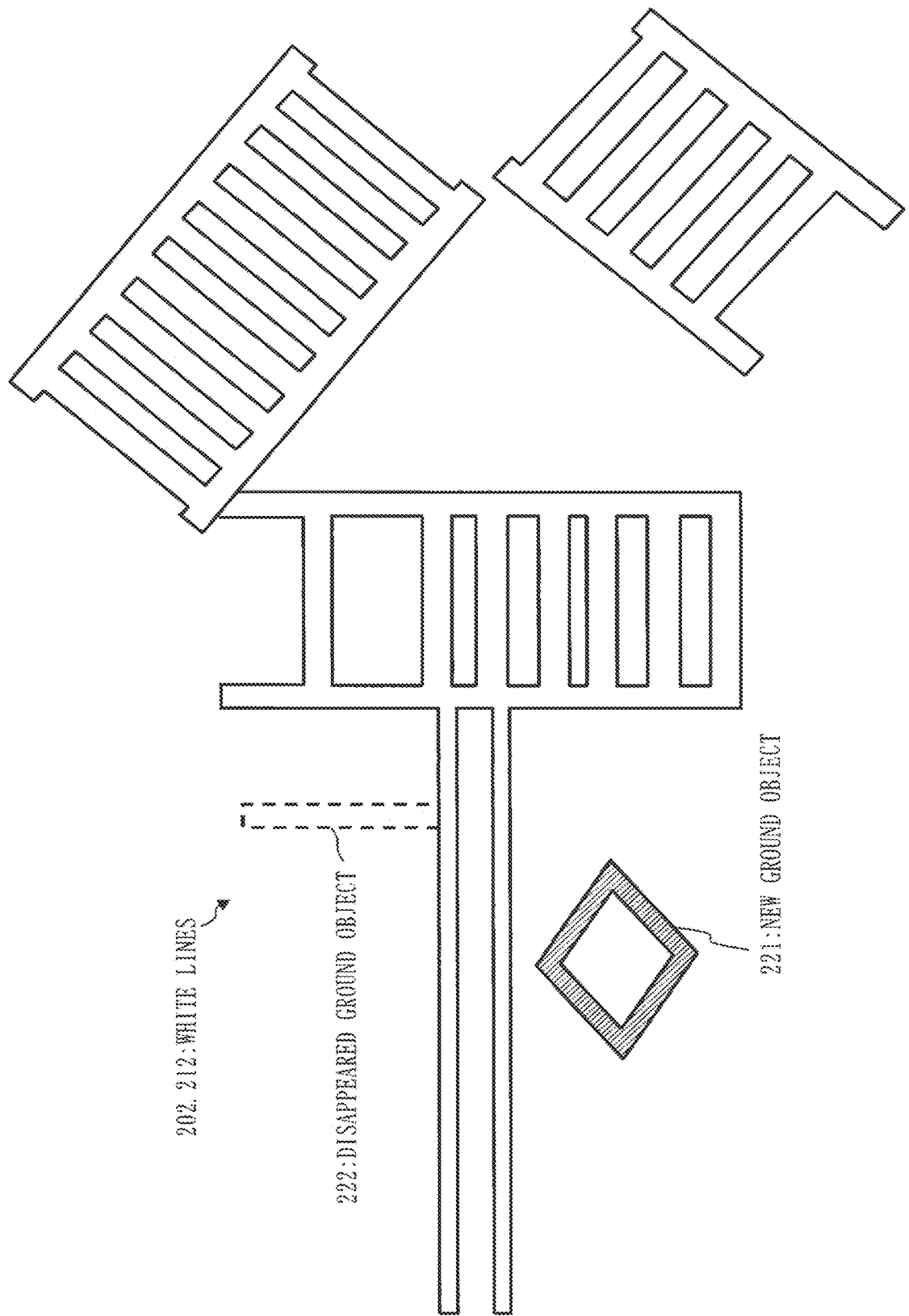
FIG. 11 is a diagram illustrating a new ground object 221 and a disappeared ground object 222 of the first embodiment.

FIG. 11 illustrates a state in which the white line 202 of the map image 201 is overlaid on a white line 212 of a corrected point cloud image 211. The corrected point cloud image 211 is a point cloud image 211 based on the corrected measurement data 182.

The difference extracting unit 113 extracts a new ground object 221 and a disappeared ground object 222, as differences.

The new ground object 221 is a portion that is not included in the white line 202 of the map image 201, but is included in the white line 212 of the corrected point cloud image 211.

The disappeared ground object 222 is a portion that is included in the white line 202 of the map image 201, but is not included in the white line 212 of the corrected point cloud image 211.

Referring back to FIG. 4, step S400 will be described.

Step S400 is a map data update process.

At step S400, the map data updating unit 114 updates the map data 181 based on the differences extracted at step S300.

Specifically, the map data updating unit 114 updates the map data 181 as follows.

When the extracted difference is a new ground object, the map data updating unit 114 adds location information for the new ground object to the map data 181. That is, the map data updating unit 114 generates ground object information of the new ground object, and adds the generated ground object information to the map data 181.

When the extracted difference is a disappeared ground object, the map data updating unit 114 deletes location information for the disappeared ground object from the map data 181. That is, the map data updating unit 114 deletes ground object information of the disappeared ground object from the map data 181.

An overview of the map data update process (S400) will be described based on FIG. 12.

Figure 12:
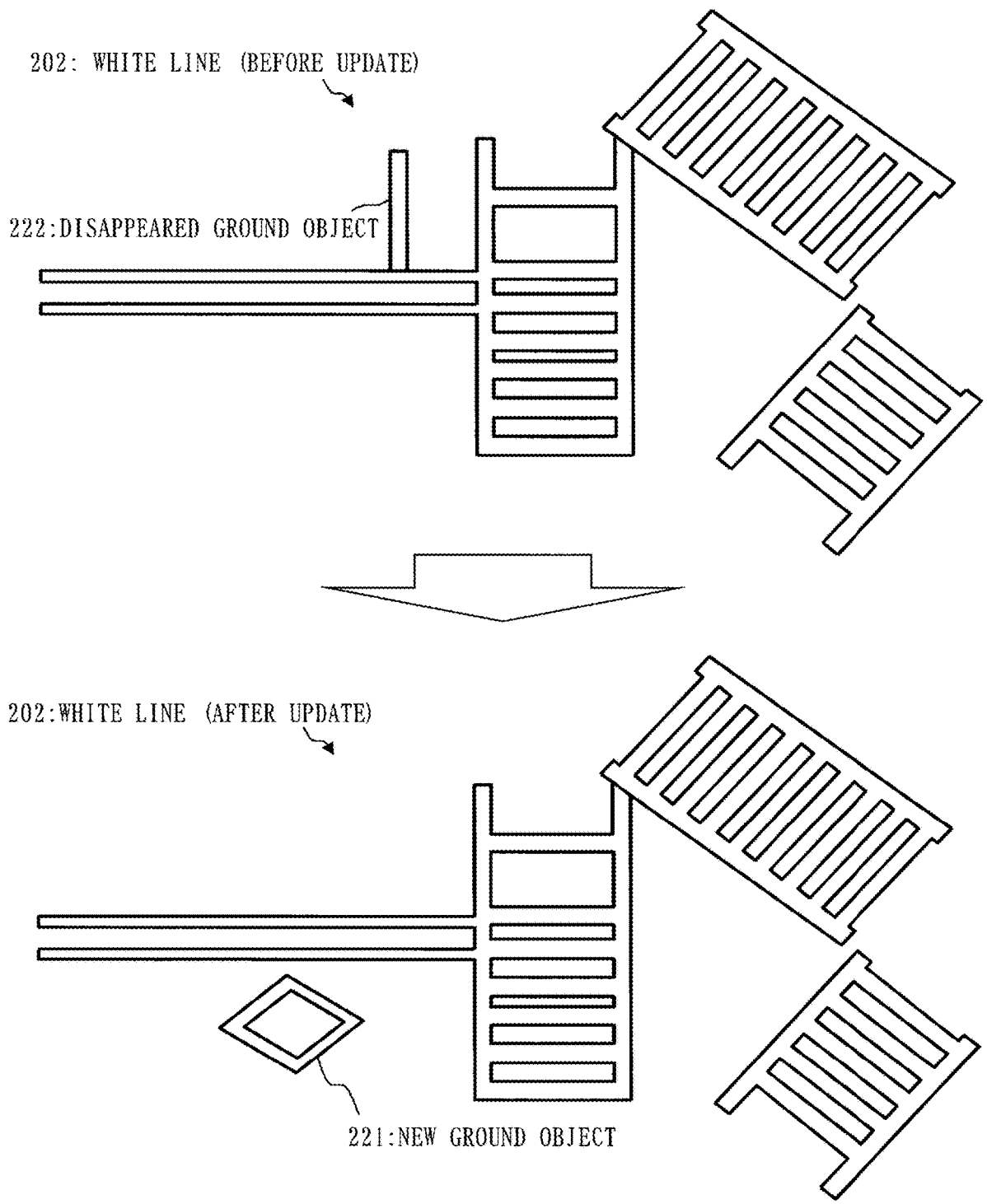
FIG. 12 is a diagram illustrating the white line 202 before and after update in the first embodiment.

FIG. 12 illustrates a white line 202 of a map image 201 before update and a white line 202 of a map image 201 after update. The map image 201 before update is a map image 201 based on map data 181 before update, and the map image 201 after update is a map image 201 based on map data 181 after update.

The map data updating unit 114 deletes the ground object information of the disappeared ground object 222 from the map data 181, and adds the ground object information of the new ground object 221 to the map data 181.

Advantageous Effects of the First Embodiment

It becomes possible to update the map data 181 using the measurement data 182 without performing actual measurement by a survey technique. Then, the time and trouble required to update the map data 181 are reduced.

When a vehicle that regularly travels the same route like a regular truck is used as a measurement vehicle for the MMS, the map data 181 can be regularly updated.

*Other Configurations*

Figure 9:
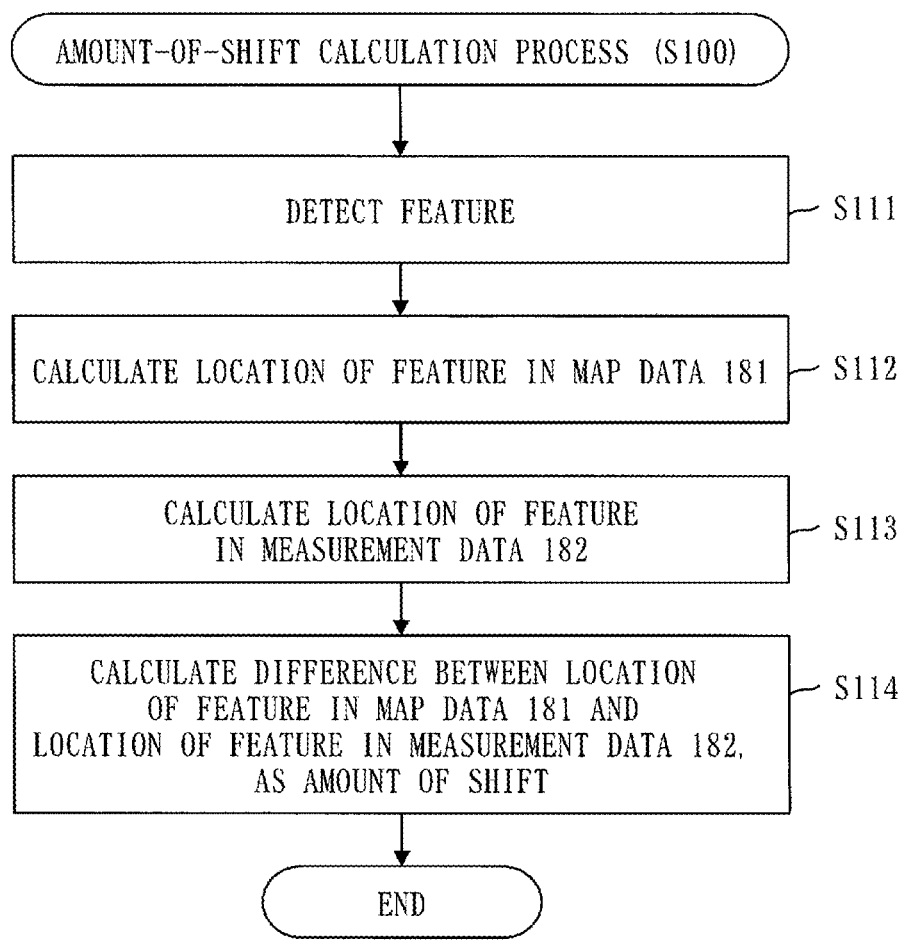
FIG. 9 is a flowchart of an amount-of-shift calculation process (S100) of the first embodiment.

The location of a feature calculated at step S112 and S113 of FIG. 9 may be a representative location based on the locations of the corners of the feature.

Specifically, the representative location is three-dimensional coordinate values representing the location of any of the corners of the feature. Alternatively, the representative location is an average of the three-dimensional coordinate values of the respective plurality of corners of the feature.

In three-dimensional measurement in the MMS, the magnitude of measurement error varies according to the distance that the measurement vehicle travels. Note, however, that the magnitude of measurement error does not change almost at all in a range of about 100 meters.

Hence, the map data update method may be performed on an update-section-by-update-section basis. In that case, a feature is detected for each update section. The update section is a section segmented by set size. The set size is a predetermined size. Specifically, the set size is 100 m×100 m where m indicates meters.

The features are preferably ground objects of types that are easily detected.

The ground objects that are preferred as features are ground objects present in large number or ground objects with very little change. The ground objects present in large number can be detected even if a change occurs in some of the ground objects, and the ground objects with very little change can always be detected.

The ground objects present in large number are white lines, curbstones, utility poles, signs, traffic lights, or the like.

The ground objects with very little change are the corners of buildings, pier posts, or the like.

In addition, although, in the first embodiment, the description is made using a white line as an example of a feature used in an amount-of-shift calculation process, any of a sign, a traffic light, etc., may be used as a feature, or detection order may be predetermined and an object that can be detected in that order may be used as a feature.

For example, detection order may be determined to be such that "a white line, a sign, and a traffic light", and when a white line has been able to be detected, the white line is used as a feature. When a white line has not been able to be detected, a sign is a candidate for a feature, and when a sign has been able to be detected, the sign is used as a feature. When a sign has not been able to be detected either, a traffic light is a candidate for a feature, and when a traffic light has been able to be detected, the traffic light is used as a feature.

In addition, of a white line, a sign, a traffic light, etc., all of those that have been able to be detected as candidates for a feature may be used as features in an amount-of-shift calculation process. That is, a plurality of ground objects (a white line, a curbstone, a utility pole, a stop line, a traffic light, etc.) may be simultaneously detected, and a difference may be extracted using the detected plurality of ground objects as reference ground objects.

In that case, each of the amount of shift for the white line, the amount of shift for the sign, and the amount of shift for the traffic light is calculated. Then, an average value of those amounts of shift may be determined to be a final amount of shift, or a final amount of shift may be calculated by weighting each of those amounts of shift.

By using a plurality of features, the accuracy of calculation of the amount of shift can be increased.

A photographed image may be used instead of the point cloud image 211.

When a photographed image is used instead of the point cloud image 211, it is premised that the location of a feature captured in the photographed image and a range in which the feature is captured in the photographed image are calculated in advance.

Since the pixels of the photographed image have higher density than the measurement points of the point cloud image 211, by using the photographed image, the accuracy of extraction of a difference can be increased.

Note, however, that when a feature is a utility pole, since it is difficult to extract the utility pole from the photographed image, it is better to use the point cloud image 211 instead of the photographed image. In the case of using the point cloud image 211, since the density of measurement points is high in a circle representing a utility pole when a point cloud is viewed from above, it is easy to extract a utility pole.

Hence, the point cloud image 211 or the photographed image may be selected according to the type of a feature.

Utilization Modes of the First Embodiment

<First Utilization Mode>

Figure 13:
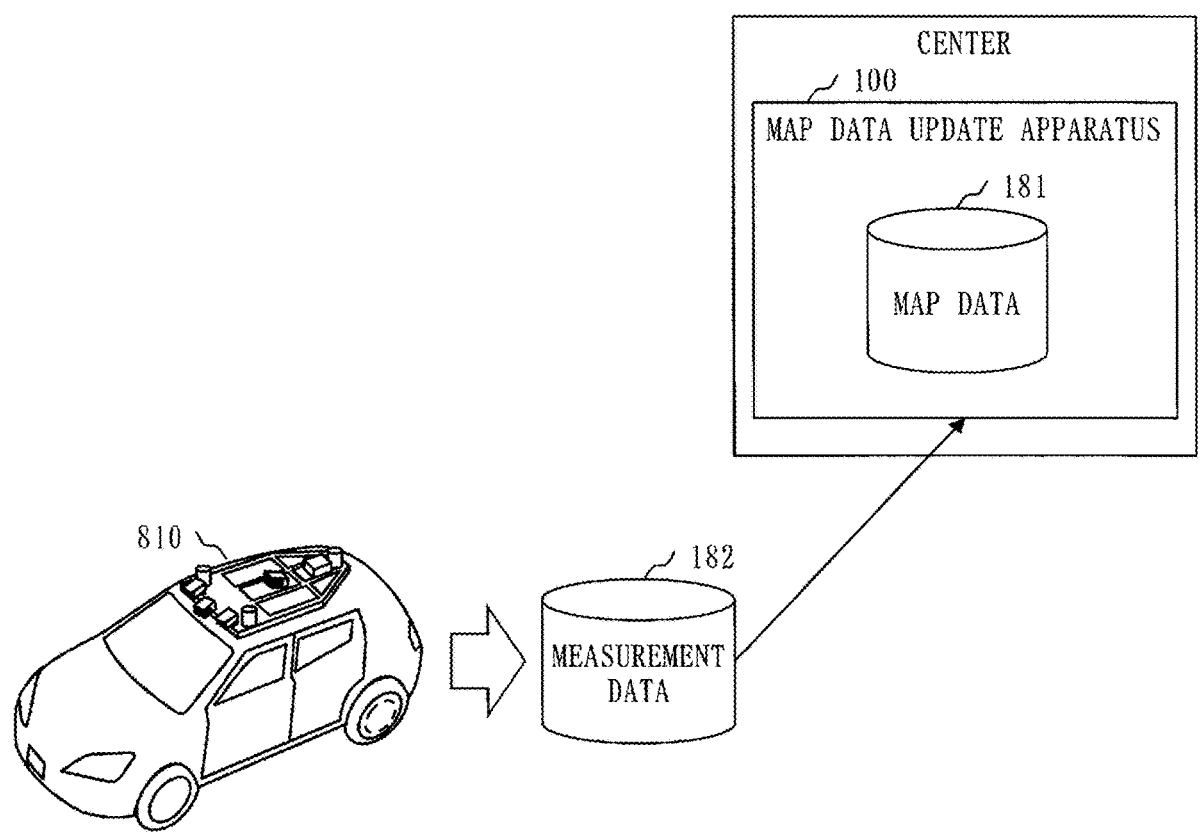
FIG. 13 is a diagram illustrating a first utilization mode of the first embodiment.

A first utilization mode of the first embodiment will be described based on FIG. 13.

The map data update apparatus 100 is provided in a center that manages map data 181.

When the measurement vehicle 810 finishes collecting measurement data 182, the measurement vehicle 810 comes back to a parking lot. In the parking lot, the measurement data 182 is taken out from the measurement vehicle 810, and the measurement data 182 taken out is transmitted to the map data update apparatus 100 in the center.

The map data update apparatus 100 in the center receives the measurement data 182, and updates the map data 181 using the received measurement data 182.

<Second Utilization Mode>

Figure 14:
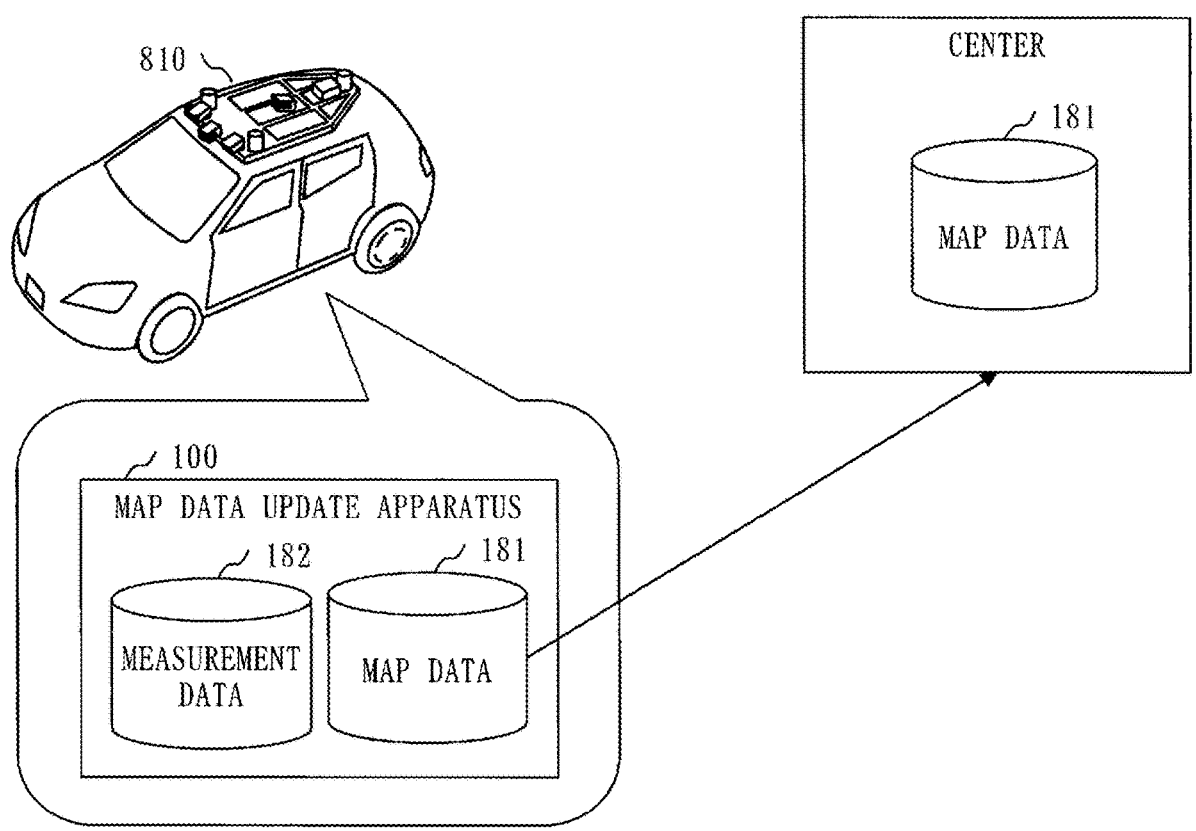
FIG. 14 is a diagram illustrating a second utilization mode of the first embodiment.

A second utilization mode of the first embodiment will be described based on FIG. 14.

The map data update apparatus 100 is mounted on the measurement vehicle 810.

The measurement vehicle 810 updates map data 181 using measurement data 182 collected by the measurement vehicle 810.

The map data 181 updated on the measurement vehicle 810 is transmitted to a center that manages map data 181.

In the center, the original map data 181 is updated using the updated map data 181.

Summary of the First Embodiment

Figure 15:
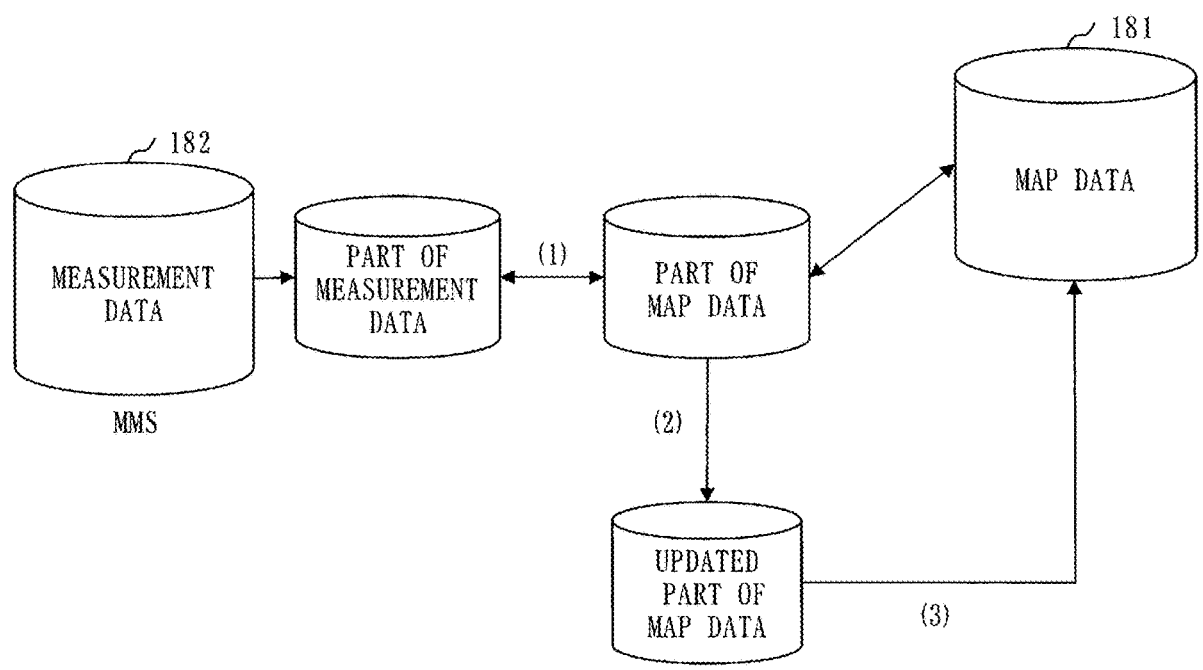
FIG. 15 is a diagram illustrating a summary of the first embodiment.

A summary of the first embodiment will be described based on FIG. 15.

(1) A part of measurement data 182 obtained by the MMS is compared with a part of map data 181 which is fundamental data, based on a feature.

(2) The part of the map data 181 is updated based on comparison results.

(3) The map data 181 is updated by reflecting the updated part of the map data 181 in the map data 181.

Second Embodiment

Figure 16:
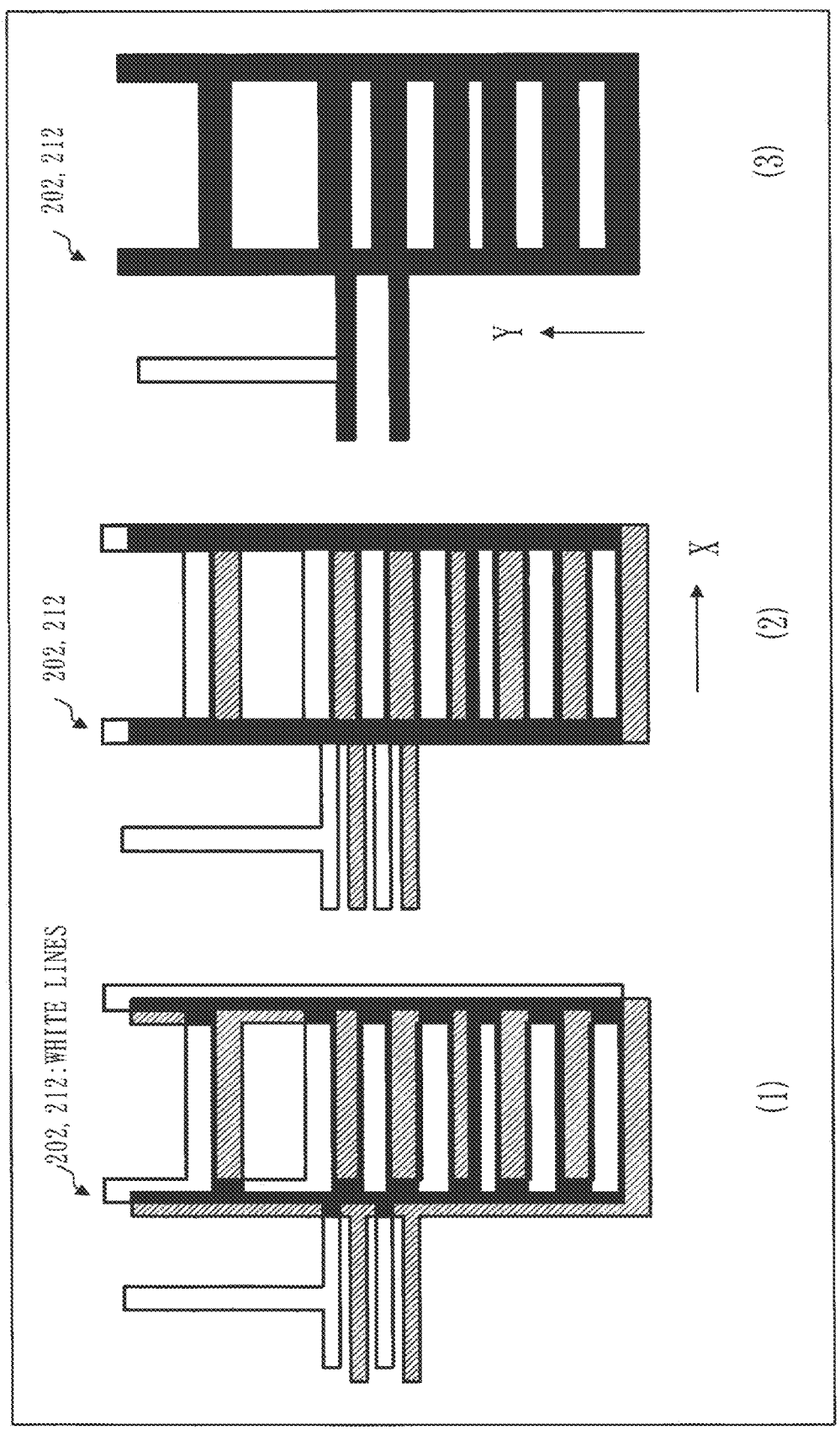
FIG. 16 is a diagram illustrating overlapping portions between white lines (202 and 212) of a second embodiment.
Figure 17:
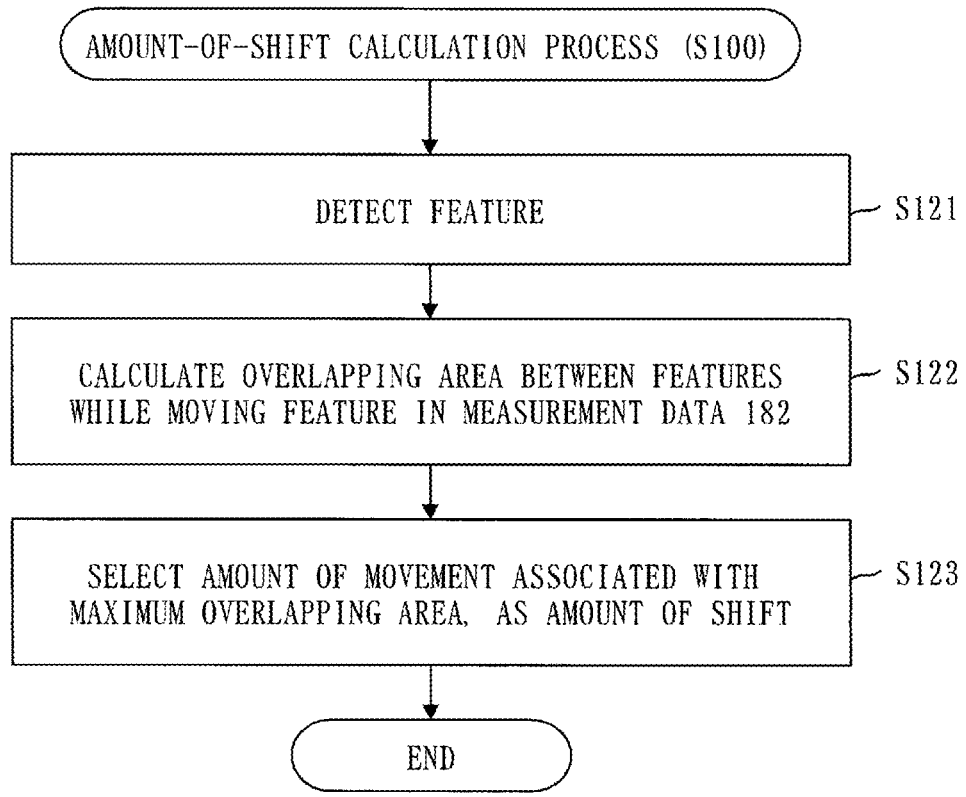
FIG. 17 is a flowchart of an amount-of-shift calculation process (S100) of the second embodiment.

For a mode in which the amount of shift between the map data 181 and the measurement data 182 is calculated based on the area of a portion in which the white line 202 of the map image 201 overlaps the white line 212 of the point cloud image 211, differences from the first embodiment will be mainly described based on FIGS. 16 and 17.

*Description of a Configuration*

Figure 2:
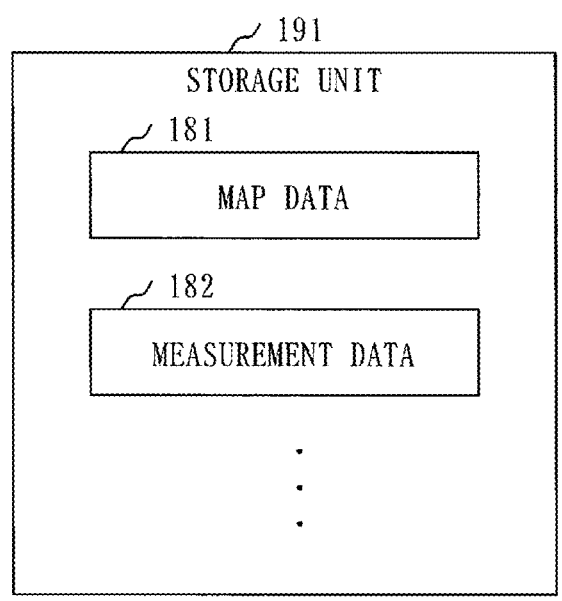
FIG. 2 is a configuration diagram of a storage unit 191 of the first embodiment.

A configuration of the map data update apparatus 100 is the same as those of FIGS. 1 and 2 in the first embodiment.

*Description of Operation*

Figure 4:
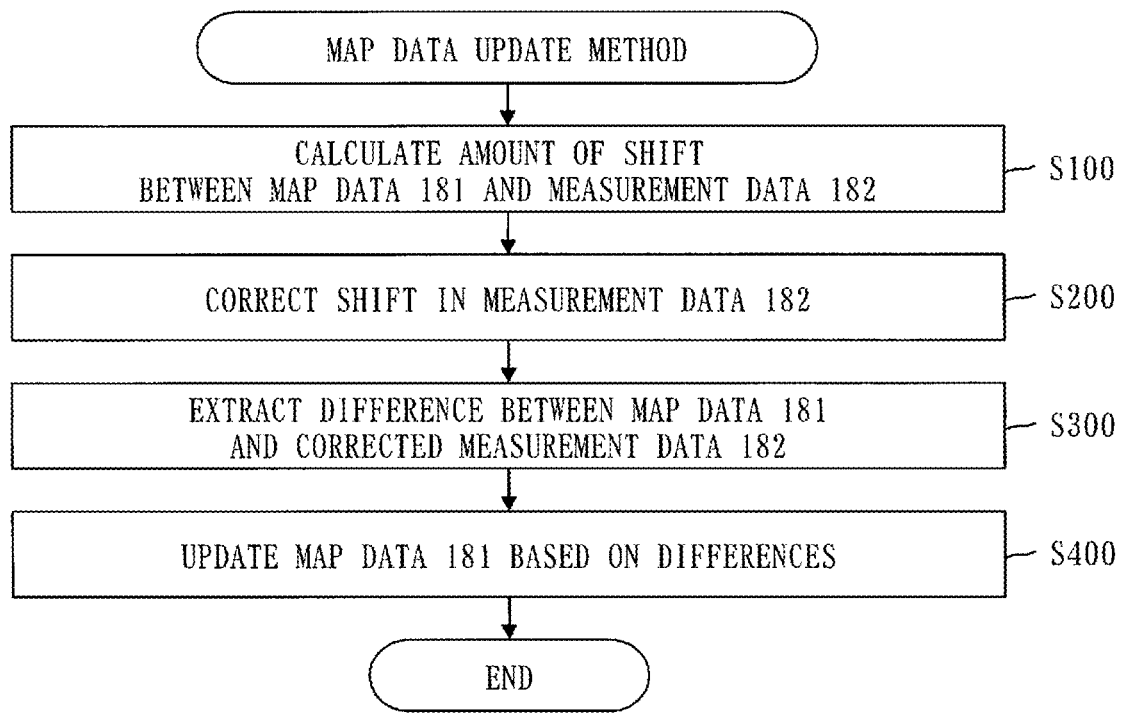
FIG. 4 is a flowchart of a map data update method of the first embodiment.

A procedure of a map data update method is the same as that of FIG. 4 in the first embodiment.

Note, however, that a procedure of the amount-of-shift calculation process (S100) differs from that of the first embodiment. The procedures of step S200 to S400 are the same as those of the first embodiment.

An overview of the amount-of-shift calculation process (S100) will be described based on FIG. 16.

An outlined portion is a white line 202 of the map image 201, a hatched portion is a white line 212 of the point cloud image 211, and a black shaded portion is an overlapping portion in which the white line 202 of the map image 201 and the white line 212 of the point cloud image 211 overlap each other.

In (1), the area of the overlapping portion is small. When the white line 212 moves in an X-direction from a state of (1), a state of (2) is obtained.

In (2), the area of the overlapping portion is medium. When the white line 212 moves in a Y-direction from the state of (2), a state of (3) is obtained.

In (3), the area of the overlapping portion is maximum.

The amount-of-shift calculating unit 111 calculates the amount of movement of the white line 212 obtained for the maximum area of the overlapping portion like (3), as the amount of shift between the map data 181 and the measurement data 182.

A procedure of the amount-of-shift calculation process (S100) will be described based on FIG. 17.

At step S121, the amount-of-shift calculating unit 111 detects a feature which is a common ground object between the map data 181 and the measurement data 182. A method for detecting a feature is the same as that at step S111 of FIG. 9 in the first embodiment.

At step S122, the amount-of-shift calculating unit 111 calculates an overlapping area between the features while moving the feature in the measurement data 182.

The overlapping area between the features is the area of a portion in which the feature in the map data 181 and the feature in the measurement data 182 overlap each other.

Specifically, the amount-of-shift calculating unit 111 calculates the overlapping area between the features as follows.

Movement directions are the X- and Y-directions. The X- and Y-directions are horizontal directions.

A movement range is a predetermined range. Specifically, the movement range is a range of $-\alpha$ to $+\alpha$ in the X-direction and a range of $-\beta$ to $+\beta$ in the Y-direction where $\alpha$ and $\beta$ are predetermined distances.

The amount-of-shift calculating unit 111 moves the feature in the measurement data 182 a unit distance in the X-direction or Y-direction in the movement range.

Then, every time the amount-of-shift calculating unit 111 moves the feature in the measurement data 182, the amount-of-shift calculating unit 111 calculates an overlapping area between the features.

In addition, every time the amount-of-shift calculating unit 111 calculates the overlapping area between the features, the amount-of-shift calculating unit 111 stores the calculated overlapping area in the storage unit 191 such that the overlapping area is associated with the amount of movement. The amount of movement to be associated with the overlapping area is the amount of movement of the feature in the measurement data 182 from its original position. The amount of movement is represented by a vector.

At step S123, the amount-of-shift calculating unit 111 selects the amount of movement associated with the maximum overlapping area. The amount of movement to be selected is the amount of shift between the map data 181 and the measurement data 182.

Specifically, the amount-of-shift calculating unit 111 selects the maximum overlapping area from the overlapping areas calculated at step S122. Then, the amount-of-shift calculating unit 111 selects the amount of movement associated with the maximum overlapping area.

Advantageous Effects of the Second Embodiment

It becomes possible to find the amount of shift between the map data 181 and the measurement data 182 with a high accuracy. As a result, the map data 181 is appropriately updated.

*Other Configurations*

The feature that is moved at step S122 of FIG. 17 may be the feature in the map data 181.

Third Embodiment

Figure 18:
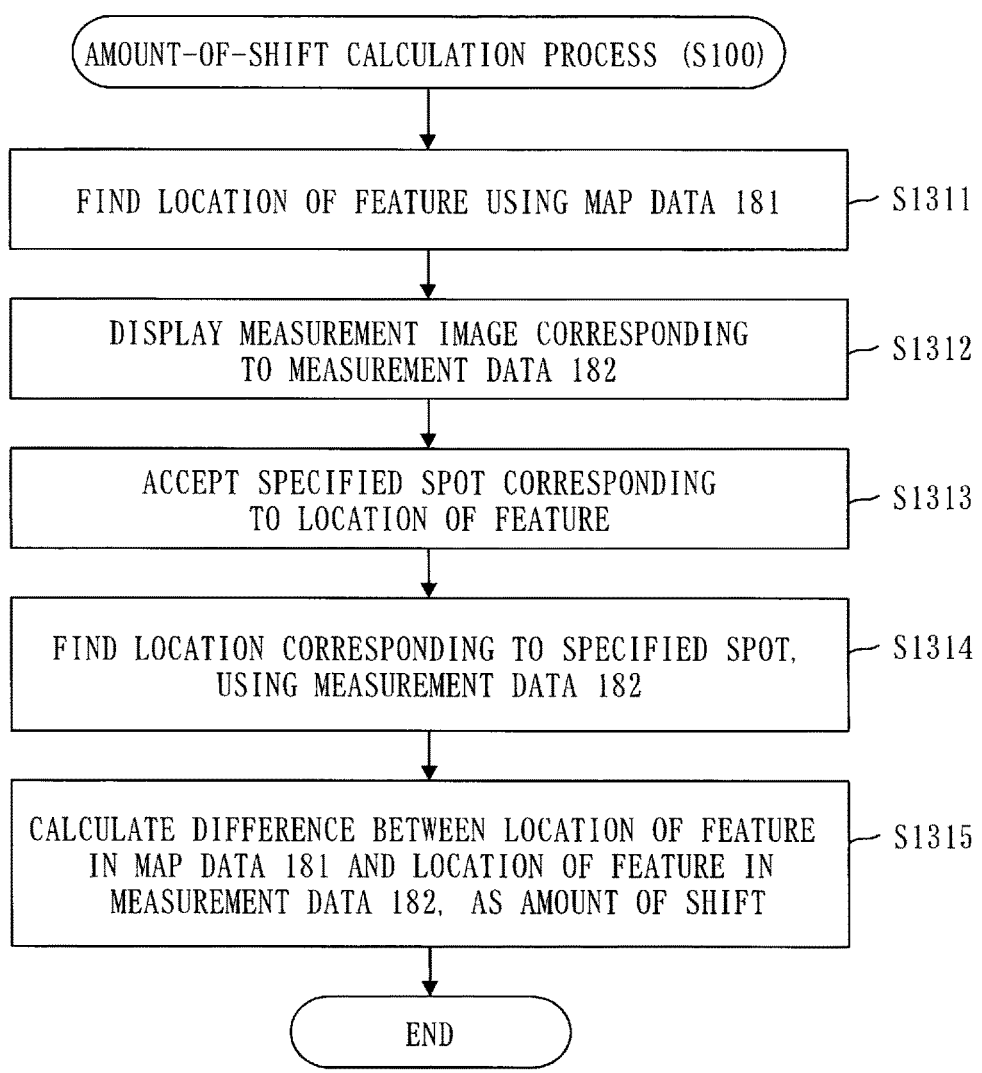
FIG. 18 is a flowchart of an amount-of-shift calculation process (S100) of a first implementation example of a third embodiment.
Figure 19:
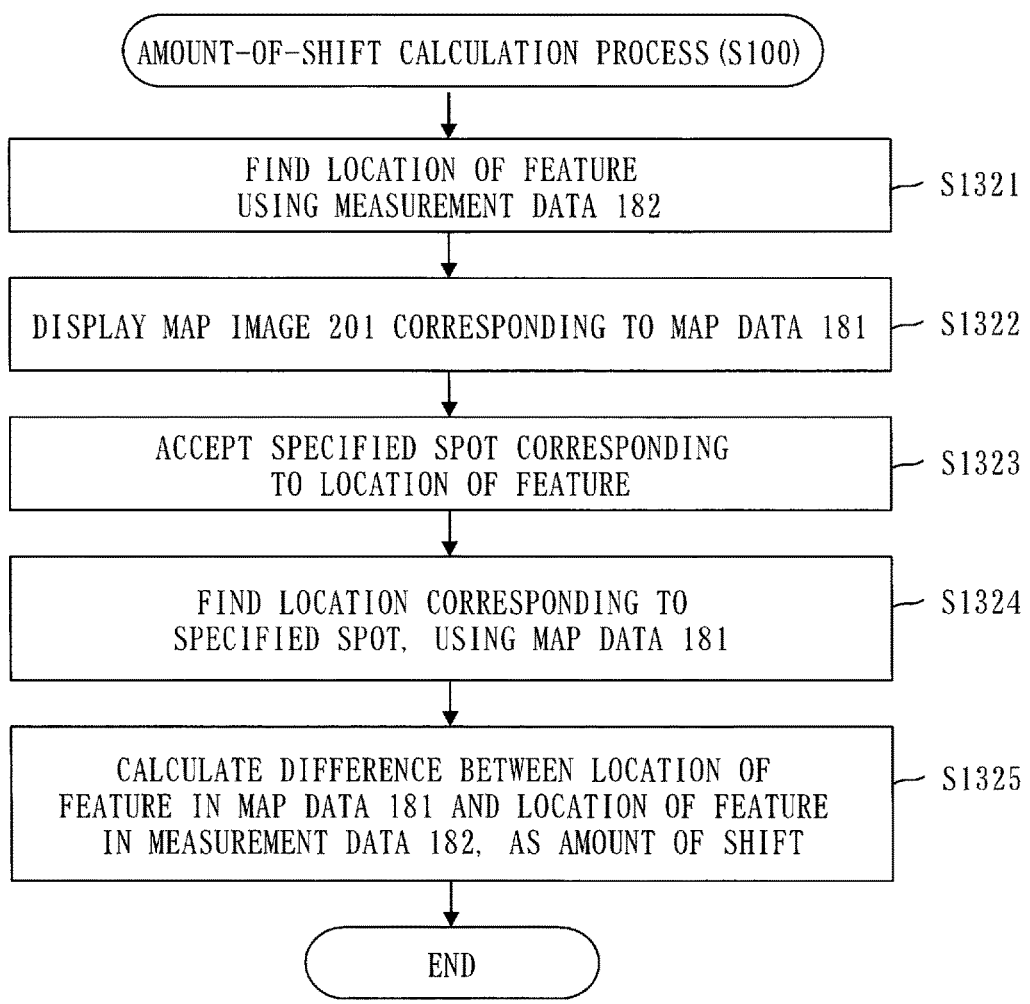
FIG. 19 is a flowchart of an amount-of-shift calculation process (S100) of a second implementation example of the third embodiment.
Figure 20:
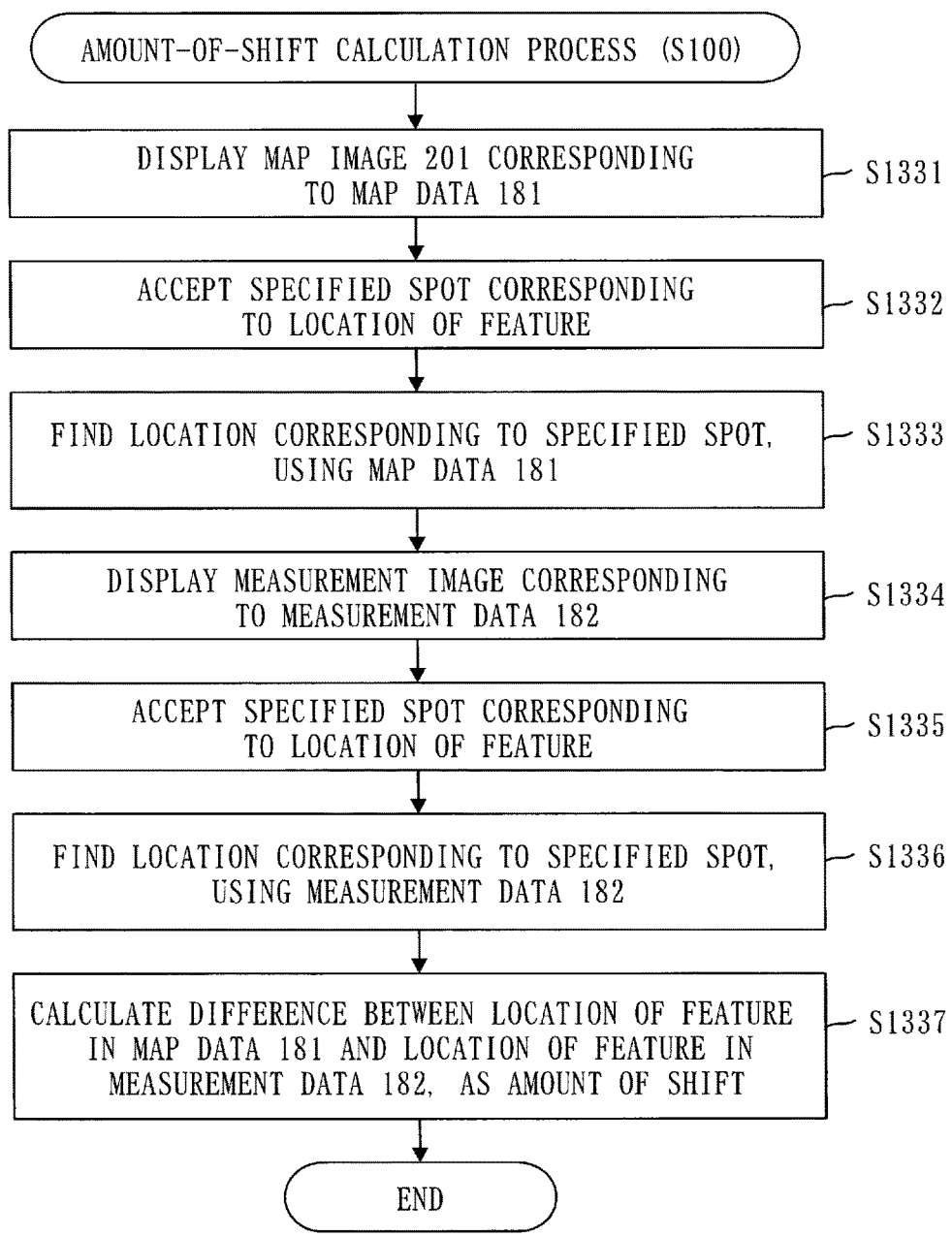
FIG. 20 is a flowchart of an amount-of-shift calculation process (S100) of a third implementation example of the third embodiment.

For a mode in which a user specifies the location of a feature, differences from the first embodiment will be mainly described based on FIGS. 18 to 20.

*Description of a Configuration*

A configuration of the map data update apparatus 100 is the same as those of FIGS. 1 and 2 in the first embodiment.

*Description of Operation*

A procedure of a map data update method is the same as that of FIG. 4 in the first embodiment.

Note, however, that a procedure of the amount-of-shift calculation process (S100) differs from that of the first embodiment. The procedures of step S200 to S400 are the same as those of the first embodiment.

For the procedure of the amount-of-shift calculation process (S100), <first implementation example> to <third implementation example> will be described below.

First Implementation Example

A procedure of the amount-of-shift calculation process (S100) will be described based on FIG. 18.

At step S1311, the amount-of-shift calculating unit 111 finds the location of a feature using the map data 181.

Specifically, the amount-of-shift calculating unit 111 finds the location of a feature as follows.

The map data 181 includes ground object information of ground objects called marker points.

The marker points are ground objects which are common marks between vehicles in the automated driving assistance system.

The amount-of-shift calculating unit 111 selects ground object information whose type is a marker point from the map data 181, and extracts location information from the selected ground object information. Three-dimensional coordinate values indicated by the extracted location information are the location of a feature.

At step S1312, the amount-of-shift calculating unit 111 creates a measurement image corresponding to the measurement data 182. Then, the display unit 192 displays the measurement image.

Specifically, the amount-of-shift calculating unit 111 creates a point cloud image 211 such as that illustrated in FIG. 6, using three-dimensional point cloud data which is the measurement data 182. Then, the display unit 192 displays the point cloud image 211.

At step S1313, the accepting unit 193 accepts a specified spot which is specified in the measurement image. The specified spot is a spot corresponding to the location of the feature.

Specifically, the specified spot is specified as follows.

First, the user finds a spot corresponding to the marker point from the measurement image displayed on the display 904.

Then, the user specifies the spot corresponding to the marker point by operating the input apparatus 905. The spot to be specified is the specified spot.

At step S1314, the amount-of-shift calculating unit 111 finds a location corresponding to the specified spot, using the measurement data 182.

Specifically, the amount-of-shift calculating unit 111 finds a location corresponding to the specified spot as follows.

First, the amount-of-shift calculating unit 111 selects a measurement point(s) corresponding to the specified spot from the point cloud image 211 which is the measurement image. The measurement point(s) corresponding to the specified spot is (are) a measurement point closest to the specified spot or three measurement points surrounding the specified spot.

Subsequently, the amount-of-shift calculating unit 111 extracts the three-dimensional coordinate values of the selected measurement point(s) from the measurement data 182.

Then, the amount-of-shift calculating unit 111 finds three-dimensional coordinate values for the specified spot, using the extracted three-dimensional coordinate values. The three-dimensional coordinate values found are location information for the specified spot.

The three-dimensional coordinate values for the specified spot are the three-dimensional coordinate values of the measurement point closest to the specified spot. Alternatively, the three-dimensional coordinate values for the specified spot are the three-dimensional coordinate values of the center of mass of a triangle whose vertices are the three measurement points surrounding the specified spot.

At step S1315, the amount-of-shift calculating unit 111 calculates a difference between the location of the feature in the map data 181 and the location of the feature in the measurement data 182. The difference to be calculated is the amount of shift between the map data 181 and the measurement data 182.

The location of the feature in the map data 181 is the location found at step S1311.

The location of the feature in the measurement data 182 is the location found at step S1314.

Second Implementation Example

A procedure of the amount-of-shift calculation process (S100) will be described based on FIG. 19.

At step S1321, the amount-of-shift calculating unit 111 finds the location of a feature using the measurement data 182.

A method for finding the location of a feature is the same as that at step S113 of FIG. 9 in the first embodiment.

At step S1322, the amount-of-shift calculating unit 111 creates a map image 201 such as that illustrated in FIG. 5, using the map data 181. Then, the display unit 192 displays the map image 201.

At step S1323, the amount-of-shift calculating unit 111 accepts a specified spot which is specified in the map image 201. The specified spot is a spot corresponding to the location of the feature.

Specifically, the specified spot is specified as follows.

First, the user finds a spot corresponding to the location of the feature from the map image 201 displayed on the display 904.

Then, the user specifies the spot corresponding to the location of the feature by operating the input apparatus 905. The spot to be specified is the specified spot.

At step S1324, the amount-of-shift calculating unit 111 finds a location corresponding to the specified spot, using the map data 181.

Specifically, the amount-of-shift calculating unit 111 finds a location corresponding to the specified spot as follows.

First, the amount-of-shift calculating unit 111 detects a feature which is a ground object located at the specified spot from the map data 181. A method for detecting a feature is the same as that at step S111 of FIG. 9 in the first embodiment.

Then, the amount-of-shift calculating unit 111 calculates the location of the feature in the map data 181. A method for calculating the location of the feature is the same as that at step S112 of FIG. 9 in the first embodiment.

At step S1325, the amount-of-shift calculating unit 111 calculates a difference between the location of the feature in the map data 181 and the location of the feature in the measurement data 182. The difference to be calculated is the amount of shift between the map data 181 and the measurement data 182.

The location of the feature in the map data 181 is the location found at step S1324.

The location of the feature in the measurement data 182 is the location found at step S1321.

Third Implementation Example

A procedure of the amount-of-shift calculation process (S100) will be described based on FIG. 20.

Step S1331 to S1333 are the same as step S1322 to S1324 of FIG. 19.

Step S1334 to S1336 are the same as step S1312 to S1314 of FIG. 18.

At step S1337, the amount-of-shift calculating unit 111 calculates a difference between the location of the feature in the map data 181 and the location of the feature in the measurement data 182. The difference to be calculated is the amount of shift between the map data 181 and the measurement data 182.

The location of the feature in the map data 181 is the location found at step S1333.

The location of the feature in the measurement data 182 is the location found at step S1336.

Advantageous Effects of the Third Embodiment

It becomes possible to detect, as appropriate, the location of a feature which is a common ground object between the map data 181 and the measurement data 182. As a result, the map data 181 is appropriately updated.

\*\*\*Other Configurations\*\*\*

A measurement image corresponding to the measurement data 182 may be a photographed image based on photographed image data.

Location information for a specified spot which is specified in the photographed image is found as follows.

First, the amount-of-shift calculating unit 111 projects a measurement point cloud onto the photographed image using three-dimensional point cloud data which is the measurement data 182. A measurement point is projected to a spot corresponding to the point of intersection of an image plane corresponding to the photographed image and a line-of-sight vector from a camera to the measurement point.

Then, the amount-of-shift calculating unit 111 regards the photographed image onto which the measurement point cloud is projected, as a point cloud image 211, and finds location information for the specified spot. A method for finding location information for the specified spot is the same as that at step S1314 of FIG. 18.

Fourth Embodiment

Figure 21:
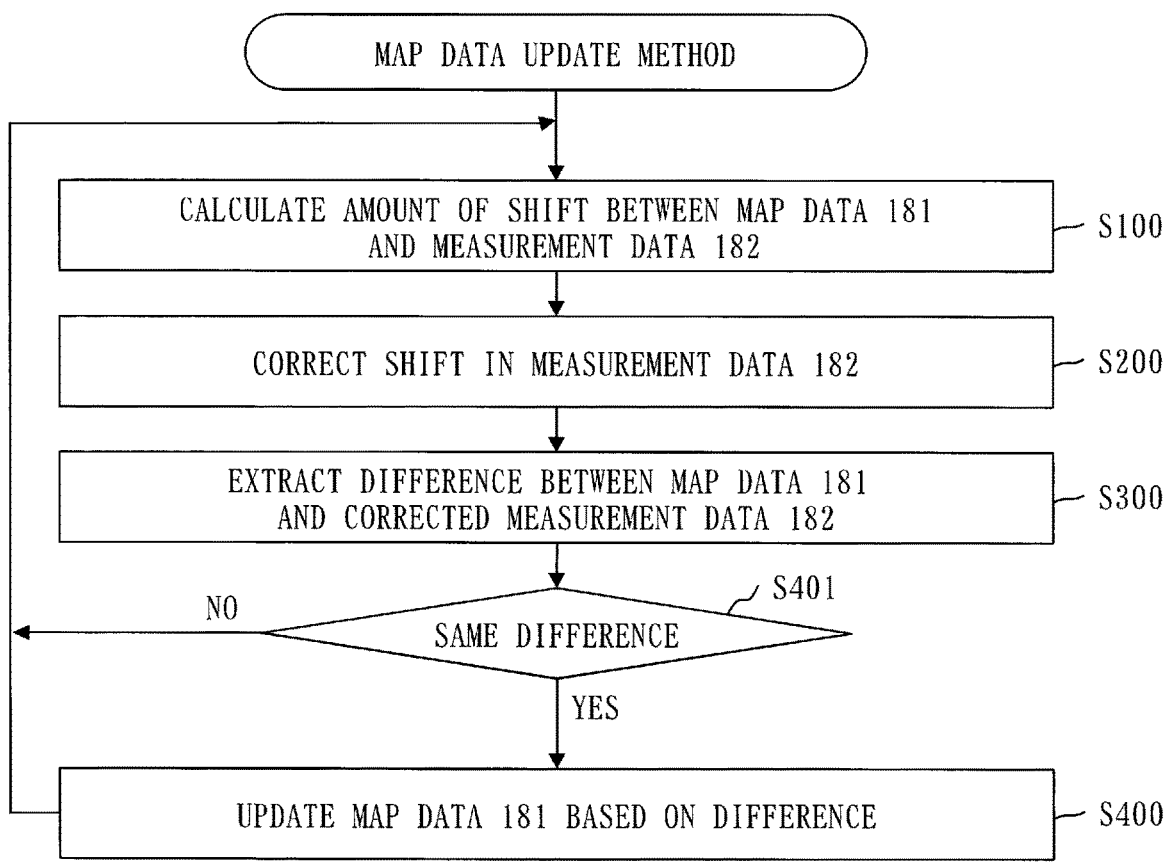
FIG. 21 is a flowchart of a map data update method of a fourth embodiment.

For a mode in which the map data 181 is updated when the same difference is extracted a plurality of times, differences from the first embodiment will be mainly described based on FIG. 21.
*Description of a Configuration*
A configuration of the map data update apparatus 100 is the same as those of FIGS. 1 and 2 in the first embodiment.
*Description of Operation*
A map data update method will be described based on FIG. 21.

Processes at step S100 to S300 are performed for each of pieces of measurement data 182 with different measurement times. Operations performed at step S100 to S300 are as described in FIG. 4 in the first embodiment.

At step S401, the map data updating unit 114 determines whether the same difference is extracted a plurality of times. Specifically, the map data updating unit 114 determines whether the same difference is extracted three times.

If the same difference is extracted a plurality of times, processing proceeds to step S400.

If the same difference is not extracted a plurality of times, processing returns to step S100.

Step S400 is as described in FIG. 4 in the first embodiment.

Advantageous Effects of the Fourth Embodiment

A temporary difference that occurs due to the presence of a pedestrian, erroneous measurement in the MMS, or the like, should not be reflected in the map data 181. When the same difference is extracted a plurality of times, the difference is reflected in the map data 181, by which the map data 181 can be appropriately updated.
*Other Configurations*
The number of times that the same difference is extracted to update the map data 181 may be two, three, or four or more.

Supplementary Remarks on the Embodiments

In the embodiments, the functions of the map data update apparatus 100 may be implemented by hardware.

Figure 22:
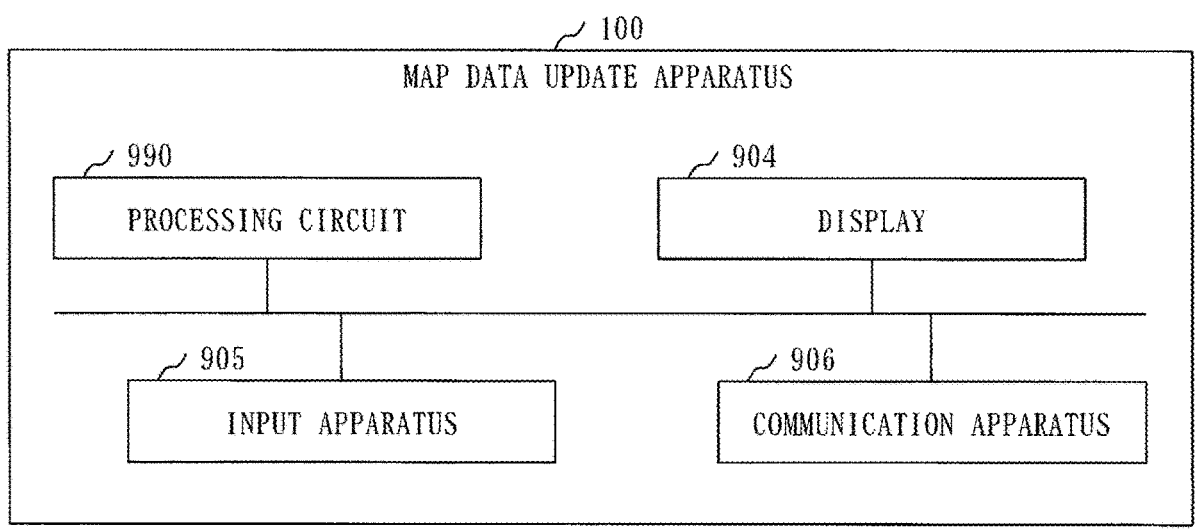
FIG. 22 is a hardware configuration diagram of the map data update apparatus 100 of the embodiments.

FIG. 22 illustrates a configuration for when the functions of the map data update apparatus 100 are implemented by hardware.

The map data update apparatus 100 includes a processing circuit 990. The processing circuit 990 is also referred to as processing circuitry.

The processing circuit 990 is a dedicated electronic circuit that implements the functions of the "units" such as the amount-of-shift calculating unit 111, the shift correcting unit 112, the difference extracting unit 113, the map data updating unit 114, and the storage unit 191.

Specifically, the processing circuit 990 is a single circuit, a combined circuit, a programmed processor, a parallel programmed processor, a logic IC, a GA, an ASIC, an FPGA, or a combination thereof. The GA is the abbreviation for gate array, the ASIC is the abbreviation for application specific integrated circuit, and the FPGA is the abbreviation for field programmable gate array.

The map data update apparatus 100 may include a plurality of processing circuits which are a substitution of the processing circuit 990. The plurality of processing circuits share the functions of the "units".

The functions of the map data update apparatus 100 may be implemented by a combination of software and hardware. That is, some of the functions of the "units" may be implemented by software and the rest of the functions of the "units" may be implemented by hardware.

The embodiments are exemplification of preferred modes and are not intended to limit the technical scope of the present invention. The embodiments may be partially implemented or may be implemented in combination with other modes. The procedures described using the flowcharts, etc., may be changed as appropriate.

REFERENCE SIGNS LIST

100: map data update apparatus, 111: amount-of-shift calculating unit, 112: shift correcting unit, 113: difference extracting unit, 114: map data updating unit, 181: map data, 182: measurement data, 191: storage unit, 192: display unit, 193: accepting unit, 201: map image, 202: white line, 203: center of mass, 211: point cloud image, 212: white line, 213: center of mass, 214: measurement point cloud, 215: boundary, 221: new ground object, 222: disappeared ground object, 810: measurement vehicle, 811: GPS receiver, 812: IMU, 813: odometer, 814: laser scanner, 815: camera, 901: processor, 902: memory, 903: auxiliary storage apparatus, 904: display, 905: input apparatus, 906: communication apparatus, 990: processing circuit.

The invention claimed is:
1. A map data update apparatus comprising:
processing circuitry configured to:
calculate an amount of shift in a location of a common ground object between map data and measurement data, using the map data and the measurement data, the map data including pieces of location information of ground objects present at a reference time and at a reference position of a vehicle, and the measurement data being data obtained by measurement performed at a measurement time occurring after the reference time, and including pieces of location information of ground objects present at the measurement time and at a measurement position of the vehicle different from the reference position of the vehicle, wherein the measurement data includes measurement color information and three-dimensional coordinate values of measurement points of the ground objects present at the measurement time and at the measurement position of the vehicle,
calculate corrected three-dimensional coordinate values by subtracting the amount of shift from the three-dimensional coordinate values that are the pieces of location information included in the measurement data having measurement errors,
update the three-dimensional coordinate values that are the location information to the corrected three-dimensional coordinate values,
extract a difference between a set of the ground objects present at the reference time and a set of the ground objects present at the measurement time, using the map data and the corrected measurement data, and
update the map data based on the extracted difference.

2. The map data update apparatus according to claim 1, wherein processing circuitry is further configured to:
  detect a feature, the feature being a common ground object between the map data and the measurement data,
  calculate a location of the feature in the map data and a location of the feature in the measurement data, and
  calculate a difference between the location of the feature in the map data and the location of the feature in the measurement data, as the amount of shift.

3. The map data update apparatus according to claim 2, wherein the location of the feature is a location of a center of mass of the feature.

4. The map data update apparatus according to claim 2, wherein the location of the feature is a representative location based on locations of corners of the feature.

5. The map data update apparatus according to claim 1, wherein the processing circuitry is further configured to:
  detect a feature, the feature being a common ground object between the map data and the measurement data,
  calculate an area of a portion in which the feature in the map data and the feature in the measurement data overlap each other, as an overlapping area, while moving one of the feature in the map data and the feature in the measurement data, and
  select an amount of movement associated with a maximum overlapping area, as the amount of shift.

6. The map data update apparatus according to claim 2, wherein the feature is detected for each update section, the update section being segmented by set size.

7. The map data update apparatus according to claim 2, wherein the feature is any of a white line, a sign, and a traffic light.

8. The map data update apparatus according to claim 1, wherein the processing circuitry is further configured to:
  find a location of a feature using the map data,
  find a location corresponding to a specified spot using the measurement data, the specified spot being specified in a measurement image, and
  calculate a difference between the location found using the map data and the location found using the measurement data, as the amount of shift.

9. The map data update apparatus according to claim 1, wherein the processing circuitry is further configured to:
  find a location of a feature using the measurement data,
  find a location corresponding to a specified spot using the map data, the specified spot being specified in a map image, and
  calculate a difference between the location found using the map data and the location found using the measurement data, as the amount of shift.

10. The map data update apparatus according to claim 1, wherein the processing circuitry is further configured to:
  find a location corresponding to a specified spot using the map data, the specified spot being specified in a map image,
  find a location corresponding to a specified spot using the measurement data, the specified spot being specified in a measurement image, and
  calculate a difference between the location found using the map data and the location found using the measurement data, as the amount of shift.

11. The map data update apparatus according to claim 1, wherein the processing circuitry is further configured to:
  add, when the extracted difference is a new ground object, location information for the new ground object to the map data, the new ground object being not present at the reference time but being present at the measurement time, and
  delete, when the extracted difference is a disappeared ground object, location information for the disappeared ground object from the map data, the disappeared ground object being present at the reference time but being not present at the measurement time.

12. The map data update apparatus according to claim 1, wherein the processing circuitry is further configured to:
  extract, for each of pieces of measurement data with different measurement times, a difference between the set of the ground objects present at the reference time and a set of ground objects present at a corresponding measurement time, and
  update the map data when a same difference is extracted a plurality of times.

13. A map data update method comprising:
  calculating an amount of shift in a location of a common ground object between map data and measurement data, using the map data and the measurement data, the map data including pieces of location information of ground objects present at a reference time and at a reference position of a vehicle, and the measurement data being data obtained by measurement performed at a measurement time occurring after the reference time, and including pieces of location information of ground objects present at the measurement time and at a measurement position of the vehicle different from the reference position of the vehicle, wherein the measurement data includes measurement color information and three-dimensional coordinate values of measurement points of the ground objects present at the measurement time and at the measurement position of the vehicle;
  calculating corrected three-dimensional coordinate values by subtraction the amount of shift from the three-dimensional coordinate values that are the pieces of location information included in the measurement data having measurement errors;
  updating the three-dimensional coordinate values that are the location information to the corrected three-dimensional coordinate values;
  extracting a difference between a set of the ground objects present at the reference time and a set of the ground objects present at the measurement time, using the map data and the corrected measurement data; and
  updating the map data based on the extracted difference.

14. A non-transitory computer readable medium storing a map data update program for causing a computer to:
  calculate an amount of shift in a location of a common ground object between map data and measurement data, using the map data and the measurement data, the map data including pieces of location information of ground objects present at a reference time and at a reference position of a vehicle, and the measurement data being data obtained by measurement performed at a measurement time occurring after the reference time, and including pieces of location information of ground objects present at the measurement time and at a measurement position of the vehicle different from the reference position of the vehicle, wherein the measurement data includes measurement color information and three-dimensional coordinate values of measurement points of the ground objects present at the measurement time and at the measurement position of the vehicle;
  calculate corrected three-dimensional coordinate values by subtracting the amount of shift from the three-dimensional coordinate values that are the pieces of location information included in the measurement data having measurement errors;

update the three-dimensional coordinate values that are the location information to the corrected three-dimensional coordinate values;

extract a difference between a set of the ground objects present at the reference time and a set of the ground objects present at the measurement time, using the map data and the corrected measurement data; and update the map data based on the extracted difference.

* * * * *